(12) United States Patent
Bearer et al.

(10) Patent No.: US 10,648,596 B2
(45) Date of Patent: May 12, 2020

(54) METHOD OF ASSEMBLING A CONDUIT FITTING

(71) Applicant: Swagelok Company, Solon, OH (US)

(72) Inventors: Mark D. Bearer, Akron, OH (US);
Mark A. Bennett, Bainbridge Township, OH (US); John D. Karkosiak, Broadview Heights, OH (US); Jeffrey Michael Rubinski, Wickliffe, OH (US); Peter C. Williams, Cleveland Heights, OH (US); Tobin Berry, Chagrin Falls, OH (US); Mark A. Clason, Orwell, OH (US); Eric M. Kvarda, Mentor, OH (US)

(73) Assignee: SWAGELOK COMPANY, Solon, OH (US)

( * ) Notice: Subject to any disclaimer, the term of this patent is extended or adjusted under 35 U.S.C. 154(b) by 87 days.

(21) Appl. No.: 15/891,424

(22) Filed: Feb. 8, 2018

(65) Prior Publication Data

US 2018/0172188 A1 Jun. 21, 2018

Related U.S. Application Data

(63) Continuation of application No. 14/662,391, filed on Mar. 19, 2015, now abandoned, which is a
(Continued)

(51) Int. Cl.
*F16L 15/08* (2006.01)
*F16L 19/065* (2006.01)
(Continued)

(52) U.S. Cl.
CPC .............. *F16L 15/08* (2013.01); *F16L 15/04* (2013.01); *F16L 19/061* (2013.01);
(Continued)

(58) Field of Classification Search
CPC ....... F16L 19/06; F16L 19/061; F16L 19/065; F16L 19/0653; F16L 19/08; F16L 19/10; F16L 19/103
(Continued)

(56) References Cited

U.S. PATENT DOCUMENTS

| 531,425 A | 12/1894 | Porteous |
|---|---|---|
| 1,823,061 A | 9/1931 | Pearson |

(Continued)

FOREIGN PATENT DOCUMENTS

| CN | 101120197 | 2/2008 |
|---|---|---|
| DE | 645775 | 6/1937 |

(Continued)

OTHER PUBLICATIONS

One page drawing dated Apr. 28, 2009—Standard 800 Series Space Collar Assy., (illustrated collar and fitting assembly offered for sale at least as early as Feb. 5, 2000) Swagelok Company.
(Continued)

*Primary Examiner* — Aaron M Dunwoody
(74) *Attorney, Agent, or Firm* — Calfee, Halter & Griswold LLP

(57) ABSTRACT

In a method of assembling a conduit fitting, a conduit fitting is provided, including a first coupling member, a second coupling member, an internal conduit gripping device disposed between said first coupling member and said second coupling member, and an external deformable structure. The first coupling member is pulled up with the second coupling member on an end portion of a conduit to engage the external deformable structure with an external surface of one of the first and second coupling members. After engaging the external deformable structure with the external surface of one of the first and second coupling members, the first coupling member is further pulled up with the second
(Continued)

coupling member to axially compress the external deformable structure, until an amount of torque required to continue pulling up the first coupling member increases to a predetermined torque. The predetermined torque corresponds to an initial pulled-up position in which the conduit gripping device grips and seals the conduit.

15 Claims, 12 Drawing Sheets

Related U.S. Application Data continuation of application No. 12/671,730, filed as application No. PCT/US2008/072072 on Aug. 4, 2008, now Pat. No. 9,016,732.

(60) Provisional application No. 60/953,881, filed on Aug. 3, 2007.

(51) Int. Cl.
 F16L 19/10 (2006.01)
 F16L 19/06 (2006.01)
 F16L 15/04 (2006.01)

(52) U.S. Cl.
 CPC ............ *F16L 19/065* (2013.01); *F16L 19/103* (2013.01); *Y10T 29/4995* (2015.01)

(58) Field of Classification Search
 USPC ....... 285/246, 247, 342, 341, 343, 353, 354, 285/382.7
 See application file for complete search history.

(56) References Cited

U.S. PATENT DOCUMENTS

| | | |
|---|---|---|
| 1,894,700 A | 1/1933 | Rue |
| 2,122,205 A | 6/1938 | Katzberg |
| 2,171,217 A | 8/1939 | Kreidel |
| 2,354,538 A | 7/1944 | Parker |
| 2,399,275 A | 4/1946 | Wenk |
| 2,420,778 A | 5/1947 | Herold |
| 2,511,134 A | 6/1950 | Stranberg |
| 2,544,712 A | 3/1951 | Miller |
| 2,640,716 A | 6/1953 | Bigelow |
| 2,904,355 A | 9/1959 | Creamer |
| 2,914,344 A | 11/1959 | Anthes |
| 3,006,558 A | 10/1961 | Jacobs |
| 3,037,796 A | 6/1962 | Lawman |
| 3,120,969 A | 2/1964 | Schmohl |
| 3,139,293 A * | 6/1964 | Franck .................... F16L 19/14 285/4 |
| 3,248,136 A | 4/1966 | Brozek et al. |
| 3,325,192 A | 6/1967 | Sullivan |
| 3,365,219 A | 1/1968 | Nicolaus |
| 3,441,297 A | 4/1969 | Koski |
| 3,445,128 A | 5/1969 | Teeters |
| 3,486,771 A * | 12/1969 | Conlin .................. F16L 19/065 285/39 |
| 3,521,912 A | 7/1970 | Maurer |
| 3,582,115 A | 6/1971 | Clague |
| 3,596,933 A | 8/1971 | Luckenbill |
| 3,684,322 A | 8/1972 | Kotsakis |
| 3,695,647 A | 10/1972 | Pugliese |
| 3,754,781 A | 8/1973 | Conroy |
| 3,773,169 A | 11/1973 | Zahuranec et al. |
| 3,848,905 A | 11/1974 | Hammer et al. |
| 3,972,112 A | 8/1976 | O'Sickey et al. |
| 4,136,897 A | 1/1979 | Haluch |
| 4,162,802 A | 7/1979 | Cox |
| 4,286,807 A * | 9/1981 | Bachli ................... F16L 19/005 285/382.7 |
| 4,309,050 A | 1/1982 | Legris |
| 4,437,691 A | 3/1984 | Laney |
| 4,475,748 A | 10/1984 | Ekman |
| 4,529,231 A | 7/1985 | Greenawalt |
| 4,538,842 A | 9/1985 | Kowal et al. |
| 4,568,114 A | 2/1986 | Konrad |
| 4,613,158 A | 9/1986 | Ekman |
| 4,799,717 A | 1/1989 | Kingfsford |
| 4,877,271 A | 10/1989 | McCorkle |
| 4,899,967 A | 2/1990 | Law |
| 4,900,068 A | 2/1990 | Law |
| 4,915,136 A | 4/1990 | Bartholomew |
| 4,919,455 A | 4/1990 | Yoshiro |
| 5,074,599 A | 12/1991 | Wirbel et al. |
| 5,090,738 A | 2/1992 | Rakieski |
| 5,186,501 A | 2/1993 | Mano |
| 5,269,566 A * | 12/1993 | Do ..................... F16L 19/005 285/220 |
| 5,280,967 A | 1/1994 | Varrin, Jr. |
| 5,351,998 A | 10/1994 | Behrens et al. |
| 5,429,394 A | 7/1995 | Olson |
| 5,472,016 A | 12/1995 | Szabo |
| 5,536,049 A | 7/1996 | Coules |
| 5,622,393 A | 4/1997 | Elbich et al. |
| 5,796,898 A | 8/1998 | Lee |
| 5,882,050 A | 3/1999 | Williams et al. |
| 5,921,588 A | 7/1999 | Vogel et al. |
| 6,073,976 A | 6/2000 | Schmidt et al. |
| 6,131,963 A | 10/2000 | Williams et al. |
| 6,279,242 B1 | 8/2001 | Williams et al. |
| 6,345,845 B2 | 2/2002 | Johnston |
| 6,378,908 B1 | 4/2002 | Walker |
| 6,499,511 B2 | 12/2002 | Brewis |
| 6,517,115 B1 | 2/2003 | Bilvet |
| 6,629,708 B2 | 10/2003 | Williams et al. |
| 6,640,457 B2 | 11/2003 | Williams et al. |
| 6,641,180 B2 | 11/2003 | Udhoefer |
| 6,757,950 B2 | 7/2004 | Malone |
| 6,851,729 B2 | 2/2005 | Gibson |
| 6,860,514 B2 | 3/2005 | Wentworth et al. |
| 7,002,077 B2 | 2/2006 | Pyron |
| 7,032,932 B2 | 4/2006 | Guest |
| 7,066,496 B2 | 6/2006 | Williams et al. |
| 7,108,288 B2 | 9/2006 | Bennett et al. |
| 7,194,817 B2 | 3/2007 | Williams |
| 7,240,925 B2 | 7/2007 | Fukano |
| 7,267,374 B2 | 9/2007 | Nielson |
| 7,393,018 B2 | 7/2008 | Williams et al. |
| 7,416,225 B2 | 8/2008 | Williams |
| 7,497,483 B2 | 3/2009 | Williams et al. |
| 7,549,677 B2 | 6/2009 | Feger |
| 7,690,696 B2 | 4/2010 | Mallis et al. |
| 7,695,027 B2 | 4/2010 | Williams et al. |
| 8,398,124 B2 | 3/2013 | Bennett |
| 8,608,210 B2 | 12/2013 | Kainec |
| 8,678,444 B2 | 3/2014 | LeQuere |
| 8,960,728 B2 | 2/2015 | Williams |
| 9,528,640 B2 | 12/2016 | Yoon |
| 9,611,961 B2 | 4/2017 | Bennett |
| 10,415,727 B2 * | 9/2019 | Williams ................ F16L 19/08 |
| 2002/0148128 A1 * | 10/2002 | Williams ................ F16L 19/00 33/501.45 |
| 2004/0212192 A1 | 10/2004 | Williams et al. |
| 2005/0097763 A1 * | 5/2005 | Williams ................ F16L 19/00 33/501.45 |
| 2005/0242582 A1 | 11/2005 | Williams et al. |
| 2005/0264005 A1 | 12/2005 | Norman |
| 2006/0237962 A1 | 10/2006 | Anderson et al. |
| 2007/0170723 A1 | 7/2007 | Asakawa |
| 2008/0054626 A1 | 3/2008 | Bearer et al. |
| 2008/0246278 A1 | 10/2008 | Williams |
| 2009/0127803 A1 | 5/2009 | Chelchowski |
| 2009/0289452 A1 | 11/2009 | Bennett |
| 2010/0171309 A1 | 7/2010 | Kainec |
| 2010/0213705 A1 * | 8/2010 | Williams ............... F16L 19/103 285/332.3 |
| 2010/0219631 A1 | 9/2010 | Williams et al. |
| 2010/0230957 A1 * | 9/2010 | Tsuda .................... F16L 19/065 285/330 |
| 2011/0277309 A1 | 11/2011 | Bearer et al. |

(56) References Cited

U.S. PATENT DOCUMENTS

| | | | | |
|---|---|---|---|---|
| 2011/0298211 | A1* | 12/2011 | Williams | F16L 19/10 285/389 |
| 2012/0005878 | A1* | 1/2012 | Rubinski | F16L 19/103 29/525.11 |
| 2012/0043757 | A1* | 2/2012 | Williams | F16L 19/103 285/339 |
| 2012/0313367 | A1* | 12/2012 | Yoon | F16L 19/103 285/93 |
| 2015/0323110 | A1* | 11/2015 | Trivett | F16L 15/08 285/389 |
| 2015/0362101 | A1 | 12/2015 | Bearer | |
| 2016/0091126 | A1* | 3/2016 | Gibson | F16L 19/10 285/382 |
| 2016/0169425 | A1 | 6/2016 | Williams | |
| 2017/0089497 | A1 | 3/2017 | Williams et al. | |
| 2017/0276270 | A1* | 9/2017 | Brown | F16L 19/061 |
| 2019/0145557 | A1* | 5/2019 | Mueller | F16L 19/061 |

FOREIGN PATENT DOCUMENTS

| | | |
|---|---|---|
| DE | 1775542 | 7/1971 |
| DE | 2145760 | 3/1973 |
| DE | 4041679 | 6/1992 |
| DE | 19607784 | 10/1996 |
| DE | 19736765 | 2/1999 |
| DE | 10206684 | 8/2003 |
| DK | 112060 | 11/1968 |
| EP | 863354 | 9/1998 |
| EP | 286568 | 12/1998 |
| EP | 1020675 | 7/2000 |
| EP | 1271038 | 1/2003 |
| EP | 1612467 | 1/2006 |
| GB | 384700 | 12/1932 |
| GB | 743690 | 1/1956 |
| GB | 981709 | 1/1965 |
| GB | 2165899 | 4/1986 |
| JP | 7-243564 | 9/1995 |
| KR | 1998-072685 | 11/1998 |
| WO | 93/025837 | 12/1993 |
| WO | 05/019717 | 3/2005 |
| WO | 05/106310 | 11/2005 |
| WO | 07/002576 | 1/2007 |
| WO | 08/057983 | 5/2008 |
| WO | 09/020900 | 2/2009 |
| WO | 11/099667 | 8/2011 |

OTHER PUBLICATIONS

Office action from European Application No. 05738925.6 dated Nov. 21, 2019.

* cited by examiner

METHOD OF ASSEMBLING A CONDUIT FITTING

RELATED APPLICATIONS

This application is a continuation application of U.S. application Ser. No. 14/662,391, filed Mar. 19, 2015 and titled "Pull-up by Torque Fitting with Compressible Member," which is a continuation application of U.S. application Ser. No. 12/671,730, filed Aug. 8, 2011 and titled "Pull-up by Torque Fitting with Compressible Member," which is the U.S. national phase entry of PCT/US2008/072072, filed Aug. 4, 2008 and titled "Pull-up by Torque Ferrule Fitting", which claims priority to prior U.S. Provisional Application Ser. No. 60/953,881, filed Aug. 3, 2007, the disclosures of each of which are fully incorporated herein by reference.

BACKGROUND OF THE INVENTION

Flareless fittings have been in use for decades for conduits such as tubes and pipes. A flareless fitting is used to connect or join two tube or pipe ends or to connect a conduit end to another assembly such as a tank, a valve, a manifold and so on. The applications are as varied as the types of assemblies with which the fittings are used. One very common type of flareless fitting is a ferrule type fitting. In a ferrule type fitting, one or more ferrules are used to join or connect a conduit end to a fitting member, typically called a fitting body. The fitting body may then be joined to (or be part of) another assembly. In a ferrule type fitting, the ferrule or ferrules must establish a fluid tight seal, particularly under pressure, as well as adequate grip of the conduit and protection against vibration fatigue. High performance fittings, such as are available from Swagelok Company, Solon, Ohio, are capable of withstanding pressures many times the rated pressure of the fitting without leaking, without vibration fatigue and without conduit blow out to the point that the conduit will burst before a seal is compromised or the ferrule(s) may lose their grip on the conduit.

Ferrule style fittings have an advantage over other end connections in that they do not rely on any special preparation of the tube or pipe end, other than low cost squaring and deburring. This is because the ferrules create the seals and tube grip.

Lower cost markets, such as the automotive industry, have their own performance requirements for fluid connections. Most notably, automotive assembly requires simpler assembly procedures. The automotive industry has resisted using ferrule type fittings not only for cost reasons, but also for assembly needs. Typical ferrule type fittings are assembled by what is commonly known as pull-up by turns. Two threaded components, such as a nut and body, enclose the conduit end and one or more ferrules. The assembly is first tightened to a finger tight condition and then a prescribed number of turns, such as one and a quarter or one and a half turns, are used to pull-up the fitting to its assembled condition. The number of turns is carefully prescribed to prevent over torque or inadequate pull-up. The automotive industry on the other hand typically wants to assemble parts by torque. This allows a simple torque wrench or tool to be used to make the final assembly with the assurance that the final assembly has been properly assembled.

SUMMARY OF THE DISCLOSURE

In accordance with an inventive aspect of the disclosure, a method of assembling a conduit fitting is contemplated. In an exemplary method, a conduit fitting is provided, including a first coupling member, a second coupling member, an internal conduit gripping device disposed between said first coupling member and said second coupling member, and an external deformable structure. The first coupling member is pulled up with the second coupling member on an end portion of a conduit to engage the external deformable structure with an external surface of one of the first and second coupling members. After engaging the external deformable structure with the external surface of one of the first and second coupling members, the first coupling member is further pulled up with the second coupling member to axially compress the external deformable structure, until an amount of torque required to continue pulling up the first coupling member increases to a predetermined torque. The predetermined torque corresponds to an initial pulled-up position in which the conduit gripping device grips and seals the conduit.

In another exemplary method, a conduit fitting is provided, including a fitting nut, a fitting body, and an internal conduit gripping device disposed between said fitting nut and said fitting body, wherein the fitting nut includes an external deformable structure integrally formed with an end portion of the fitting nut. The fitting nut is pulled up with the fitting body on an end portion of a conduit to engage the external deformable structure with an external surface of the fitting body. After engaging the external deformable structure with the external surface of the fitting body, the fitting nut is further pulled up with the fitting body to axially compress the external deformable structure, until an amount of torque required to continue pulling up the fitting nut increases to a predetermined torque. The predetermined torque corresponds to an initial pulled-up position in which the conduit gripping device grips and seals the conduit.

In another exemplary method, a conduit fitting is provided, including a first coupling member, a second coupling member, an internal conduit gripping device disposed between said first coupling member and said second coupling member, and an external deformable structure integrally formed with one of the first and second coupling members. The first coupling member is pulled up with the second coupling member on an end portion of a conduit to engage the external deformable structure with an external surface of the other of the first and second coupling members. After engaging the external deformable structure with the external surface of the other of the first and second coupling members, the first coupling member is further pulled up with the second coupling member to axially compress the external deformable structure, until an amount of torque required to continue pulling up the first coupling member increases by a predetermined amount, wherein the predetermined amount comprises at least a factor of two. The predetermined torque increase corresponds to an initial pulled-up position in which the conduit gripping device grips and seals the conduit.

BRIEF DESCRIPTION OF THE DRAWINGS

These and other inventive aspects and features of the present disclosure will become apparent to one skilled in the art to which the present invention relates upon consideration of the following description of the exemplary embodiments with reference to the accompanying drawings, in which.

DETAILED DESCRIPTION OF THE INVENTION

Figure 1:
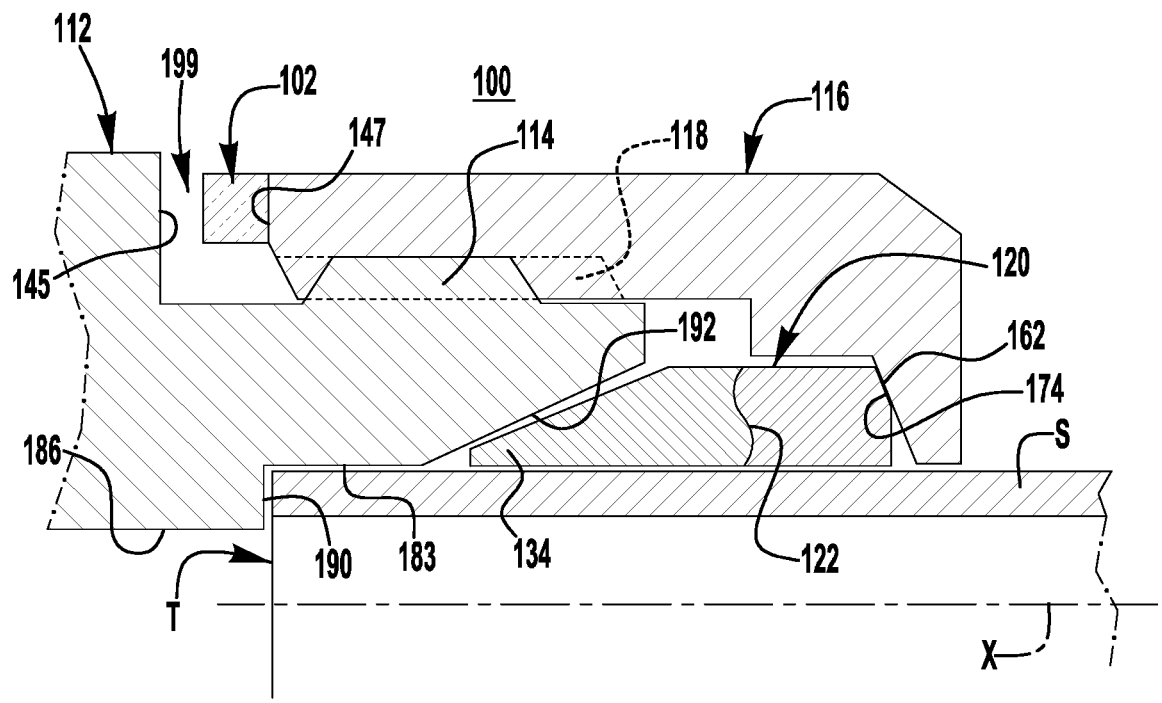
FIG. 1 illustrates a longitudinal cross-section of an exemplary embodiment of a fitting with an external deformable or compressible structure that facilitates pull-up by torque.

While the inventions are described herein with specific reference to a variety of structural and material features, such descriptions are intended to be exemplary in nature and should not be construed in a limiting sense. For example, the exemplary embodiments are described primarily in terms of a stainless steel tube fitting for automotive applications. Those skilled in the art, however, will readily appreciate that any one or more of the aspects and features of the invention may be used outside of the automotive industry, may be used with materials other than stainless steel and may be used with many conduits including, but not limited to, tube or pipe. Still further, many of the exemplary embodiments herein illustrate what is commonly known as a female-style fitting, meaning that a female (i.e. internally) threaded component receives and abuts the conduit end. Many aspects of the female-style embodiments will find application in male-style fittings as will be apparent to those skilled in the art. Similarly, many of the exemplary embodiments herein illustrate male-style fittings. Many aspects of the male-style embodiments will find application in female-style fittings as will be apparent to those skilled in the art. The invention will also find application for fitting assemblies that do not require threaded connections between the fitting components, for example clamped or bolted fittings may be used. The invention will also find application far beyond the exemplary embodiments herein as to connections that may be made to a wide and ever expansive variety of fluid components including, but not limited to, other conduits, flow control devices, containers, manifolds and so on.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Although the various embodiments are described herein with specific reference to the fitting components being made of stainless steel, such description is intended to be exemplary in nature and should not be construed in a limiting sense. Those skilled in the art will readily appreciate that the invention may be realized using any number of different types of metal material for the fitting components, as well as metal tubing materials, including but not limited to 316, 316L, 304, 304L, any austenitic or ferritic stainless steel, any duplex stainless steel, any nickel alloy such as HASTALLOY, INCONEL, MONEL, alloy 825, alloy 625, any precipitation hardened stainless steel such as 17-4PH for example, brass, copper alloys, any carbon or low allow steel such as 1020, 1030, 1040 and 12L14 steel for example. A tube gripping device may be case or through hardened to a ratio of at least 3.3 and preferably 4 or more times harder that the hardest tubing material that the fitting will be used with. Therefore, the tube gripping device need not be made of the same material as the tubing itself. For example, the tube gripping device may be selected from the stainless steel material noted above, or other suitable materials that may be case hardened, such as magnesium, titanium and aluminum, to name some additional examples.

In this application, the terms "pull-up" or "pulled-up" simply refer to a condition of the fitting where a seal and grip is formed with a conduit. The term "initial pull-up" refers to the condition of the fitting and or the positions of the fitting components the first time the fitting is pulled-up. The term "remake" or "remade" refers to the condition of the fitting and/or the position of the fitting components when the fitting was previously pulled-up to an initial pull-up position, disassembled, and pulled-up again. In many of the embodiments disclosed below, additional axial advance of the fitting components is needed to remake the fitting. In many of the embodiments disclosed herein, the fitting can be remade several times.

The present application discloses several embodiments of ferrule type, flareless fittings that may optionally be pulled-up to an assembled condition by torque rather than by turns. The fittings include structure that facilitates pull-up by torque. As illustrated by the exemplary embodiments described below, the structure may take a wide variety of different forms. Any structure that provides an additional torque rise when the fitting is properly pulled up may be employed. The torque rise may be sharp or otherwise detectable or observable. In an exemplary embodiment, the structure allows the fitting to be disassembled and remade with a successful reseal and conduit grip. The structure may be configured to allow the fitting to be disassembled and remade multiple times with a successful reseal and conduit grip each time the fitting is remade. In some embodiments, the structure facilitates repeated remake by permitting additional stroke of the fitting components to further advance a conduit gripping device, such as a ferrule, even if only slightly, each time the fitting is remade. In some embodiments, the structure facilitates remake by including an elastically deformable or compressible member that presses a conduit gripping device back into sealing engagement with a conduit when the fitting is remade to the initial pull up position. In other embodiments, the structure facilitates repeated remake by maintaining a seal between the conduit gripping device and the conduit when the fitting is disassembled, such that further advance of the ferrule is not required when the fitting is remade. The structure may be configured to allow the fitting to be remade with the same initial pull-up torque or the structure may cause the torque required for remakes to be greater than the initial pull-up torque. One example of a fitting component structure that facilitates pull-up by torque and permits additional stroke is a compressible or deformable structure defined by or used with at least one fitting component. Several exemplary embodiments of fittings that may be pulled up by torque and may be disassembled and remade are described below.

FIG. 1 illustrates an embodiment of a fitting 100 with a deformable or compressible structure 102 that facilitates pull-up by torque. The fitting 100 includes a first fitting component 112 that may be realized in the form of a male threaded body having external threads 114. The first fitting component 112 joins or connects with a second fitting component 116 that may be realized in the form of a female threaded nut having internal threads 118 that threadably mate with the threads 114 of the first component 112 when the fitting 100 is made-up or assembled. Different thread options and, alternatively, a variety of different non-threaded coupling designs may be used for the first and second fitting components. For example, a clamp arrangements that includes clamping members that do not rotate relative to one another during tightening of the clamp may be used. For example, the clamp members may be forced toward one another by separate threaded members, by a cam arrangement, by a lever arrangement, etc.

The fitting 100 further includes a conduit gripping device or assembly 120. In this application, the term conduit gripping device means any device or assembly of components that grips and/or seals against a conduit, such as a tube or a pipe, as a result of making up the fitting to an assembly. The conduit gripping device may include any number of components, such as ferrules. Typically the conduit gripping device 120 will include one or two ferrules. A conduit gripping device 120 is schematically illustrated in FIG. 1. The line 122 on the schematic illustration of a conduit gripping device 120 indicates that the conduit gripping device 120 may comprise a single ferrule, there may be two ferrules, or alternative gripping devices may be used. A wide variety of conduit gripping devices 120 may be used. Examples of conduit gripping devices that may be used include, but are not limited to, the tube gripping devices described in U.S. Pat. No. 5,882,050 issued on Mar. 16, 1999; U.S. Pat. No. 6,131,963 issued on Oct. 17, 2000; and U.S. Patent Application Publication No. 2005/0242582 published on Nov. 3, 2005; which are incorporated herein by reference in their entirety. The nut 116 and tube gripping device 120 fit onto a conduit end T that is received by the body 112.

The female nut 116 has a drive surface 174 that contacts a driven surface 162 of the conduit gripping device 120 during pull-up. The male threaded body 112 is a generally cylindrical part centered on the axis X. The body 112 has an opening 183 adapted to receive the tube end T. A central bore 186 extends through the body 112 and defines a fluid flow path. The central bore 186 may be in communication with another part such as a valve, tee, elbow, manifold, etc. It should be noted that although the male threaded fitting component 112 is shown as a separate stand alone part, the features of the component by which it may make a fluid connection with the female threaded fitting component could, alternatively, be incorporated into a bulk body such as a manifold, valve, pump, tank, and so on, commonly referred to as a fluid port.

The opening 183 may include a shoulder 190. The tube end T bottoms, possibly not initially but preferably after pull-up, against the shoulder 190 when received by the body 112. The opening 183 may have a slight taper. If included, the slight taper may help form a seal about the tube end T upon pull-up of the fitting 10. The male fitting component 112 further includes a tapered surface, such as for example frusto-conical surface 192. The frusto-conical surface 192 forms a conduit gripping device or ferrule camming surface in the body 112 and may be axially adjacent the forward end of the opening 183. The ferrule camming surface is formed at an angle that may be selected to optimize the camming action with a nose portion 134 of the tube gripping device 120. In typical two ferrule and one ferrule fittings, this angle is about twenty degrees but may be any suitable value from about ten degrees to about sixty degrees, for example, forty-five degrees.

The male threads 114 of the body 112 threadably mate with the threads 118 on the female nut 116. The body 112 may be provided with tool engagement surfaces, such as hex flats, to facilitate holding the body while the nut 116 is being tightened down during pull-up. Of course, pull-up involves relative axial translation between the fitting components, the nut 116 and body 112, in this case effected by relative rotation between the nut and body, regardless of which fitting component is being held and which is being turned. In a non-threaded coupling, pull-up involves relative axial translation between the two fitting components by means other than two threaded components, such as for example two components forced together by a clamping device.

The body 112 or the nut 116 may include a marking or a structure 199 that may be used to provide an intrinsic gauging function to verify proper pull-up for both pull-up by torque and pull-up by turns. By intrinsic gauging is meant a structure or feature associated with the fitting itself (as contrasted with a separate tool or gauge) that provides an indication to the assembler that the fitting has been properly assembled and pulled up. A large variety of structures or features may perform the intrinsic gauging function, some examples of which are disclosed in International Application No. 03/07739 and U.S. Pat. Nos. 6,640,457 and 7,194,817, the entire disclosures of which are fully incorporated herein by reference. A gap gauge may also be used in a known manner to confirm proper pull-up of the fitting 100. In the example illustrated by FIG. 1, the intrinsic gauging structure 199 is a gap between the fitting component 112 and the deformable or compressible member 102 that is closed when the fitting is pulled up.

The conduit gripping component nose portion 134 is positioned at least partially within the camming mouth formed by the ferrule camming surface 192. The driven surface 162 of the tube gripping device engages the drive surface 174 of the nut 116. In an exemplary embodiment, when the fitting is pulled up, the tube gripping device 120 bites or indents into the tube surface S, producing a strong tube grip and a fluid tight seal. However, an appropriate grip and seal may not necesarily involve a bite or indent.

In the example illustrated by FIG. 1, the nut 116 includes the deformable or compressible structure 102 that causes the amount of torque required to continue pulling-up the fitting to increase once the fitting reaches the initial pull up position. In the exemplary embodiment, the increase in torque caused by the deformable or compressible structure is sharp enough to provide a clear indication that the fitting has reached the proper initial pull up position. The deformable or compressible structure 102 may be formed integrally with the nut 116, integrally with the body 112, have a portion integrally formed with the nut and a portion integrally formed with the body, attached to the nut, attached to the body, and/or the deformable or compressible structure 102 may be a separate component. The deformable or compressible structure 102 may be formed on an external surface of the male threaded body or an outer portion of the nut 116 that is radially outward of the female threads 118 of the nut 116. The deformable or compressible structure 102 may take a wide variety of different forms. Any structure that deforms and/or compresses when sandwiched between two members of the fitting and causes torque required to continue pulling up the fitting past a proper initial pull up position to sharply increase may be used. The structure 102 may be a plastically deformable structure or an elastically deformable structure. Examples of materials that may be used for plastically deformable structures include, but are not limited to, soft malleable metals, metal and plastic composites, metal and soft metal composites, and ductile plastics. Examples of soft maleable metals include, but are not limited to pure elements and alloys comprising Tin, Lead, Aluminum, Zinc, Copper, Cadmium, Silver, and Gold. The soft malleable metals may be cast, wrought, metal injection molded or sintered powder metal. Examples of metal and plastic composites include, but are not limited to, metal wire or metal sheet integrated into hydrocarbon polymers, and aluminum sheet laminar sandwiched with a cross linked saturated wax. Examples of metal and soft metal composites include, but are not limited to, thin stainless steel wire integrated in a sufficiently pure soft copper, and tin sheet encased lead. Examples of ductile plastics include, but are not limited to, low density polyethylene, and short linked polycarbonate. Examples of materials that may be used that elastically deform when the fitting is pulled-up include, but are not limited to, high strength metals and high strength composites. Examples of high strength metals include, but are not limited to, austenitic, ferritic, martensitic, and duplex alloys of Iron, Titanium, Aluminum, Cobalt, Chromium, Nickel, Molybdenum, Niobium, and Tungsten. Additional examples of high strength metals include, but are not limited to, alloys that are work hardened, age hardened, precipitate hardened, and interstitial hardened, for example by low temperature carburization. The high strength metals may be cast, wrought, formed by metal injection molded or sintered powder metal. Examples of high strength composites include, but are not limited to, metal alloys and high yield strength plastics reinforced with alumina, graphite, silicon carbide whiskers, glass fiber, boron, and/or carbon nanofiber, for example alumina fiber reinforced aluminum, and carbon nanofiber reinforced polyether-ether-ketone.

In this application the term "plastically deformable structure" means a structure in a fitting that is plastically deformed when the fitting is pulled up to any position beyond a proper initial pull up position. In one embodiment, the plastically deformable structure is not plastically deformed by pulling up the fitting to a proper initial pull up position. In another embodiment, the plastically deformable structure is somewhat plastically deformed by pull up to a proper initial pull up position. A plastically deformable structure may or may not be elastically deformed by pulling the fitting up to the initial pull up position. In this application, the term "elastically deformable structure" means a structure in a fitting that is elastically deformed by pulling up the fitting to a proper initial pull up position. An elastically deformable structure may or may not be plastically deformed by pulling up the fitting to some position beyond the initial pull up position.

In the embodiment illustrated by FIG. 1 the deformable or compressible structure 102 is sandwiched between the surface 145 on the of the male threaded body 112 and the surface 147 on the nut 116. When the fitting 100 is pulled-up the compression or deformation of the structure 102 between the surface 147 and the surface 145 causes the amount of torque required to continue pulling up the fitting to sharply increase.

The ability of the deformable or compressible structure 102 to be compressed or deformed to facilitate additional axial advance of the components, 112, 116 allows the fitting to be remade. Each remake of the fitting 100 progresses the fitting body 112 further into the nut 116 for each re-make, even if only slightly. In one embodiment, the deformable or compressible structure 102 is configured such that the torque required to remake the fitting is the same as the initial pull-up torque. In another embodiment, the torque required to remake the fitting is greater than the torque required to initially pull up the torque. In one embodiment, the deformable or compressible structure 102 is plastically deformed a first time when the fitting is initially pulled up by applying the initial pull-up torque and is then further plastically deformed by applying the same initial torque to remake the fitting 100. In one embodiment, the deformable or compressible structure 102 is elastically deformed a first time when the fitting is pulled-up by applying the initial pull-up torque and is then elastically deformed a second time, to a greater extent, by applying the same initial torque to remake the fitting. Many properties of the fitting components affect the torque required to initially pull-up the fitting and the torque required to remake the fitting. As such, the material and/or configuration of the deformable or compressible member that allows the fitting to be remade and properly seal by applying the same torque as the initial pull-up torque will vary, depending on the properties of the fitting components.

In one embodiment, when the deformable or compressible structure 102 is a separate member, the deformable or compressible member may be configured to convert existing fittings that may be pulled up only by turns of threaded components or a set axial stroke of the components to fittings that may be pulled up by turns and may optionally be pulled up by torque, simply by adding the separate deformable or compressible member to the fitting assembly.

Figure 2:
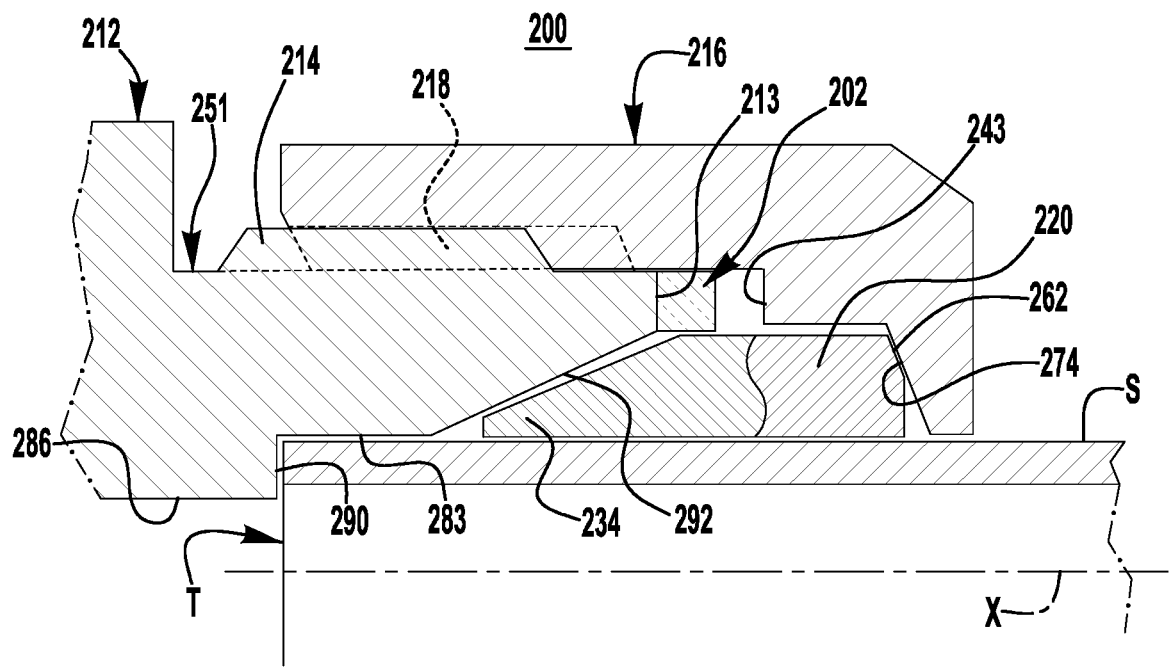
FIG. 2 illustrates a longitudinal cross-section of an exemplary embodiment of a fitting with an internal deformable or compressible structure that facilitates pull-up by torque.

FIG. 2 illustrates an embodiment of a male fitting 200 that includes an internal structure 202 that facilitates pull-up by torque. The fitting 200 includes a first fitting component 212 that may be realized in the form of a male threaded body having external threads 214 and a second fitting component 216 that may be realized in the form of a female threaded nut having internal threads 218. Different thread options and non-threaded coupling designs may be used for the first and second fitting components. The fitting 200 further includes a conduit gripping device 220. The nut 216 and conduit gripping device 220 fit onto a conduit end T that is received by the body 212.

The female nut 216 has a drive surface 274 that contacts a driven surface 262 of the conduit gripping device 220 during pull-up. The male threaded body 212 is a generally cylindrical part centered on the axis X. The body 212 has an opening 283 adapted to receive the tube end T. A central bore 286 extends through the body 212. The tube end T bottoms against a shoulder 290 when received by the body 212.

The male fitting component 212 includes a tapered ferrule camming surface 292 in the body 212 that is axially adjacent the forward end of the counterbore 283. The ferrule camming surface 292 is formed at an angle with respect to the X axis that may be selected to optimize the camming action with the nose portion 234 of the front tube gripping device 220. In typical two ferrule and one ferrule fittings, this angle is about twenty degrees but may be any suitable value from about ten degrees to about sixty degrees, for example, forty-five degrees.

The nose portion 234 of the tube gripping device 220 is positioned at least partially within the camming mouth formed by the ferrule camming surface 292. When the fitting is pulled up, the tube gripping devices 220 bites or indents into the tube surface S.

The body 212 and/or the nut 216 may include a marking or structure 251 that may be used to provide an intrinsic gauging function to verify proper pull-up for both pull-up by torque and pull-up by turns. In the example illustrated by FIG. 2, the marking 251 comprises an unthreaded neck of the male nut. The marking 251 may take a wide variety of different forms and may be any combination of markings and/or structures on the body 212, and/or the nut 216.

In the example illustrated by FIG. 2, the internal compressible or deformable structure 202 is disposed around at least a portion of the conduit gripping device 220. In another embodiment, the deformable or compressible structure 202 is axially spaced from the tube gripping device. The deformable or compressible structure 202 may be formed integrally with the nut 216, integrally with the body 212, have a portion integrally formed with the nut and a portion integrally formed with the body, and/or the deformable or compressible structure 202 may be a separate component. The illustrated deformable or compressible structure 202 comes into abutment with a surface 243 of the nut 216 when the fitting reaches the proper initial pull up position. In an embodiment, where the deformable or compressible structure is integrally formed with the nut, the deformable or compressible structure 202 abuts a surface 213 of the body when the fitting reaches the proper initial pull up position. In an embodiment where the deformable or compressible structure 202 is a separate member, the deformable or compressible structure is compressed between the surfaces 243, 213 when the fitting reaches the proper initial pull up position. The deformable or compressible structure is configured to cause the amount of torque required to continue pulling-up the fitting to sharply increase once the deformable or compressible member is engaged between the body and the nut, and thereby provides an indication that the fitting is properly pulled up.

The ability of the deformable or compressible member 202 to be compressed allows the fitting to be remade. Each remake of the fitting 200 progresses the nut 216 further onto the fitting body 212 for each re-make, even if only slightly.

In one embodiment, the internal structure 202 is configured to convert an existing fitting that may be pulled up only by turns to a fitting that may be pulled up by turns and may optionally be pulled up by torque, by adding the separate member to the existing fitting assembly.

Figure 3A:
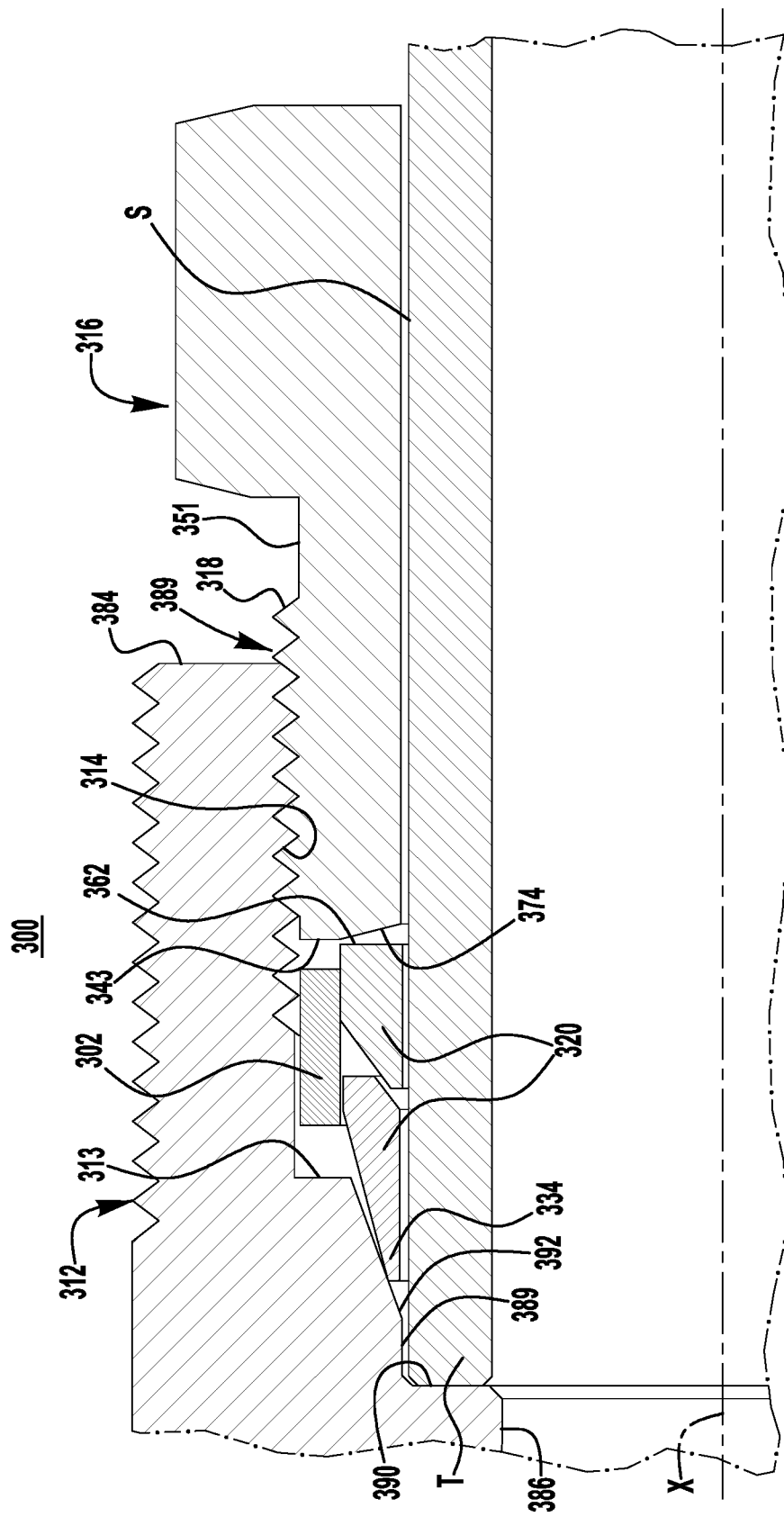
FIG. 3A illustrates a longitudinal cross-section of an exemplary embodiment of a fitting with an internal deformable or compressible structure that facilitates pull-up by torque.
Figure 3B:
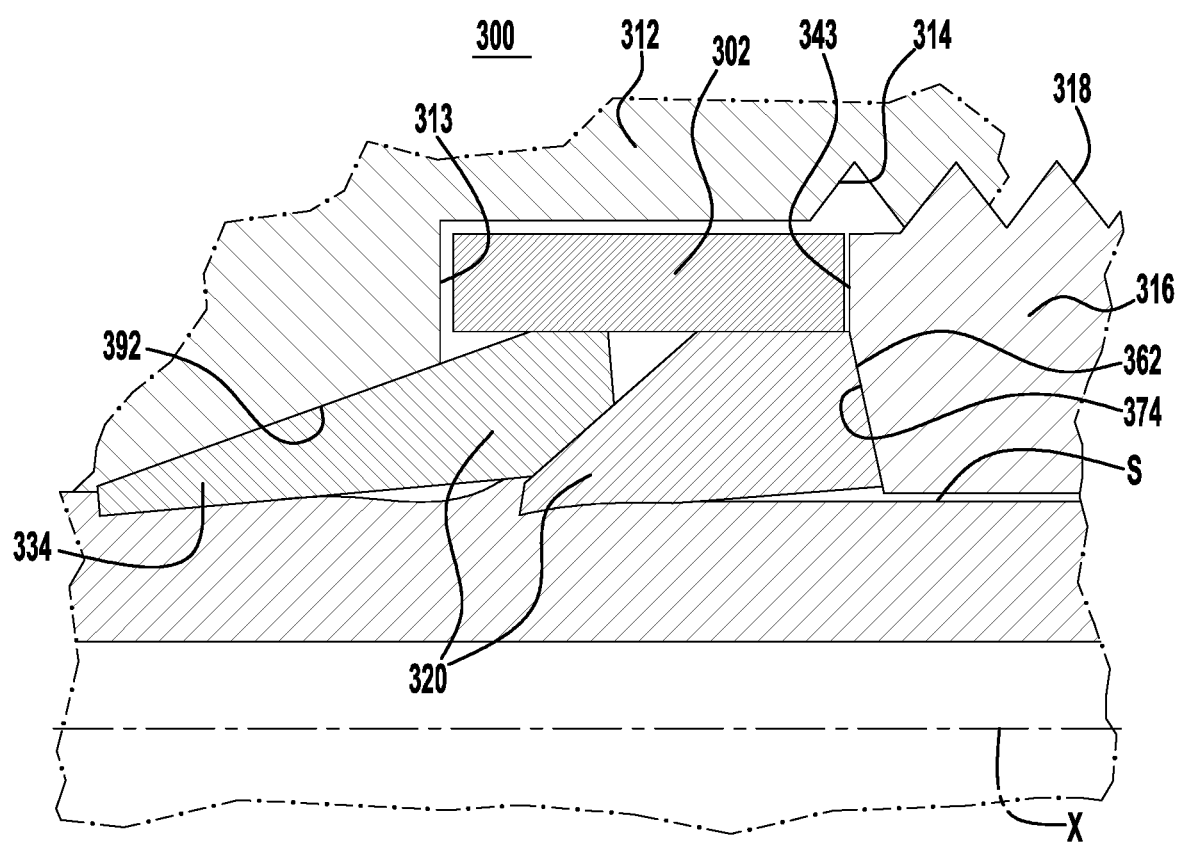
FIG. 3B illustrates the fitting of FIG. 3A in a pulled-up condition.

FIGS. 3A and 3B illustrate an embodiment of a female fitting 300 that includes an internal ring 302 that facilitates pull-up by torque. The fitting 300 includes at least a first fitting component 312 that may be realized in the form of a female threaded body having internal threads 314 and a second fitting component 316 that may be realized in the form of a male threaded nut having external threads 318. Different thread options and non-threaded coupling designs may be used for the first and second fitting components. The fitting 300 further includes a conduit gripping device 320. In the example illustrated by FIGS. 3A and 3B, the conduit gripping device comprises front and rear ferrules. However, the conduit gripping device 320 may comprise a single ferrule or a non-ferrule alternative. The nut 316 and tube gripping device 320 fit onto a conduit end T that is received by the body 312.

The male nut 316 has a drive surface 374 that contacts a driven surface 362 of the conduit gripping device 320 during pull-up. The female threaded body 312 is a generally cylindrical part centered on the axis X. The body 312 has an opening 383 at a forward end 384 adapted to receive the tube end T. A central bore 386 extends through the body 312. The female body further includes a counterbore 389 that forms a shoulder 390. The tube end T bottoms against the shoulder 390 when received by the body 312.

The female fitting component 312 further includes a tapered surface 392. The surface 392 forms a ferrule camming surface in the body 312. The ferrule camming surface is formed at an angle that may be selected to optimize the camming action with the nose portion 334 of the front ferrule of the conduit gripping device 320. In typical two ferrule and one ferrule fittings, this angle is about twenty degrees but may be any suitable value from about ten degrees to about sixty degrees.

The body 312 and/or the nut 316 may include a marking or structure 351 that may be used to provide an intrinsic gauging function to verify proper pull-up for both pull-up by torque and pull-up by turns. In the example illustrated by FIGS. 3A and 3B, the marking 351 comprises an unthreaded neck of the male nut. The marking 351 may take a wide variety of different forms and may be any combination of markings and/or structures on the body 312, and/or the nut 316.

The nose portion 334 of a first ferrule of the conduit gripping device 320 is positioned partially within the camming mouth formed by the ferrule camming surface 392. The driven surface 362 of a second ferrule of the conduit gripping device engages the drive surface 374 of the nut 316. When the fitting is pulled up, conduit gripping device 320 bites and indents into the tube surface S.

In the examples illustrated by FIGS. 3A and 3B, the internal ring 302 is disposed in the fitting body 312. The internal ring 302 may be disposed around all or a portion of the conduit gripping device 320 or the ring 302 may be axially spaced from a conduit gripping device. The ring 302 abuts an interior surface 313 of the fitting body and a surface 343 of the nut 316. The ring 302 is made from a deformable or compressible material and is configured to cause the amount of torque required to continue pulling-up the fitting to sharply increase after the ring 302 is engaged by the fitting body 312 and the nut 316.

Referring to FIG. 3B, when the fitting 300 is pulled-up, the ring 302 engages the nut 316 and the body 312 to cause the amount of torque required to continue pulling up the fitting to sharply increase. The deformability or compressibility of the ring 302 after the fitting has reached the initial pull up position allows the fitting to be remade. Each remake of the fitting 300 further compresses or deforms the ring 302 and progresses the nut 316 further into the fitting body 312 for each re-make, even if only slightly.

In one embodiment, the internal ring 302 is configured to convert an existing fitting that may be pulled up only by turns to a fitting that may be pulled up by turns and may optionally be pulled up by torque by adding the ring 302 to the existing fitting assembly, disassembling the existing fitting and installing the ring.

Figure 4:
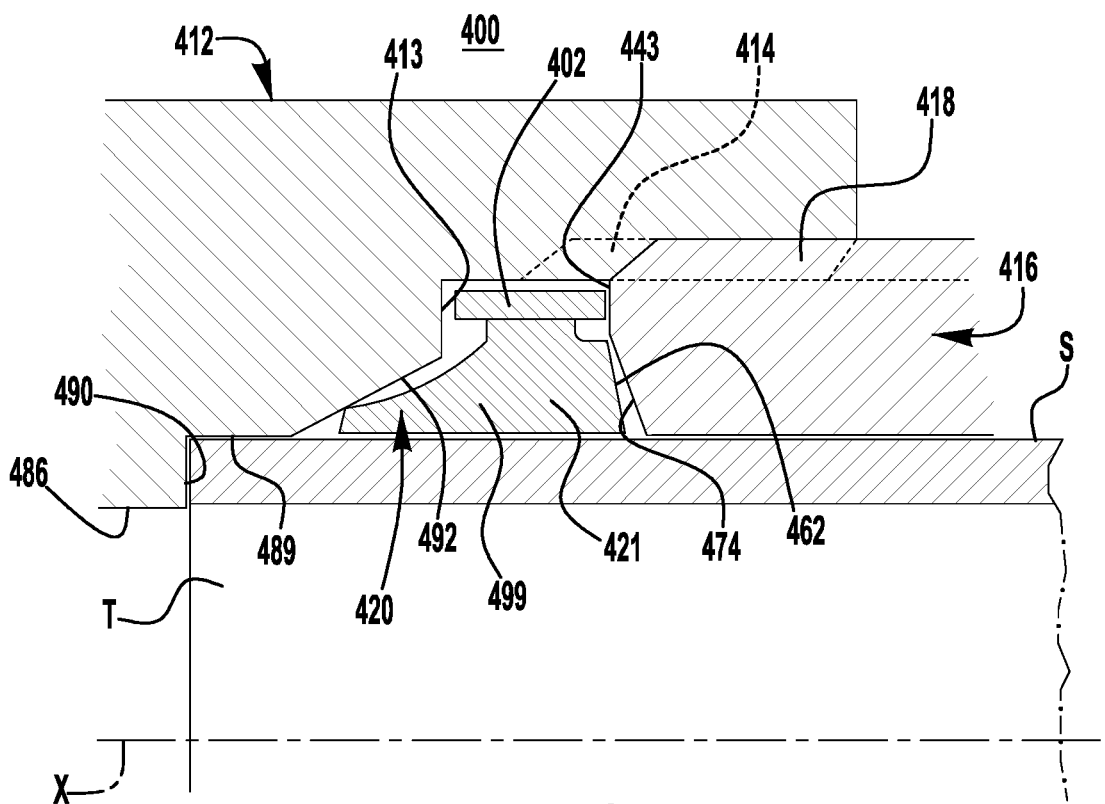
FIG. 4 illustrates a longitudinal cross-section of an exemplary embodiment of a fitting with tube gripping device with an integral deformable or compressible structure that facilitates pull-up by torque.
Figure 5:
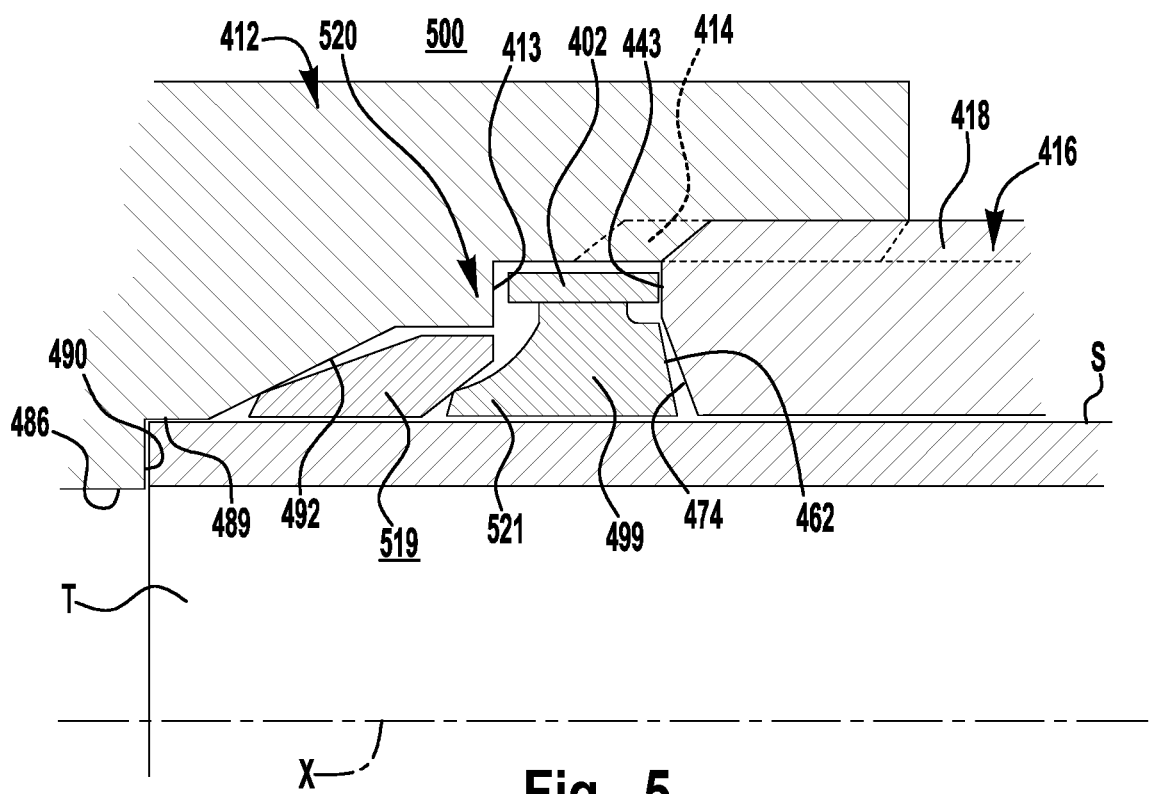
FIG. 5 illustrates a longitudinal cross-section of an exemplary embodiment of a fitting with a two ferrule tube gripping device with an integral deformable or compressible structure that facilitates pull-up by torque.

FIGS. 4 and 5 illustrate embodiments of fittings 400, 500 that include conduit gripping devices 420, 520 with integral deformable or compressible structures 402 that facilitate pull-up by torque. The conduit gripping device 420 comprises a single ferrule 421 and the conduit gripping device 520 comprises a front ferrule 519 and a rear ferrule 521. The integral deformable or compressible structures 402 are configured to allow the fitting 400, 500 to be pulled up by turns or by torque. The fittings 400, 500 each include at least a first fitting component 412 that may be realized in the form of a female threaded body having internal threads 414 and a second fitting component 416 that may be realized in the form of a male threaded nut having external threads 418. Different thread options and non-threaded coupling designs may be used for the first and second fitting components. The nut 416 and tube gripping devices 420, 520 fit onto a conduit end T that is received by the body 412.

The male nut 416 has a drive surface 474 that contacts a driven surface 462 of the tube gripping device 420 during pull-up. The female threaded body 412 is a generally cylindrical part centered on the axis X. The body 412 has an opening 480 adapted to receive the tube end T. A central bore 486 extends through the body 412. The opening 489 forms a shoulder 490. The tube end T bottoms against the shoulder 490 when received by the body 412.

The female fitting component 412 further includes a tapered surface 492. The tapered surface 492 forms a ferrule camming surface in the body 412. When the fitting is pulled up, the ferrules of the tube gripping device 420 or 520 bite or indent into the tube surface S.

In the examples illustrated by FIGS. 4 and 5, the integral deformable or compressible structures 402 are disposed in the fitting body 412. The illustrated integral deformable or compressible structures 402 are disposed radially outward and of a main body 499 of the ferrule of the conduit gripping device. The integral deformable or compressible structure 402 are brought into abutment with an interior surface 413 of the fitting body and a surface 443 of the nut 416 when the fitting is in the initial pull up position. The integral deformable or compressible structure 402 is made from a deformable or compressible material and is configured to cause the amount of torque required to continue pulling-up the fitting to sharply increase after the integral deformable or compressible structure 402 is engaged by the fitting body 412 and the nut 416. The ability of the integral structure 402 to be deformed or compressed allows the fitting to be remade by allowing additional advance of the fitting components after initial pull up. Each remake of the fitting 400 further progresses the nut 416 further into the fitting body 412 for each re-make, even if only slightly.

Figure 6:
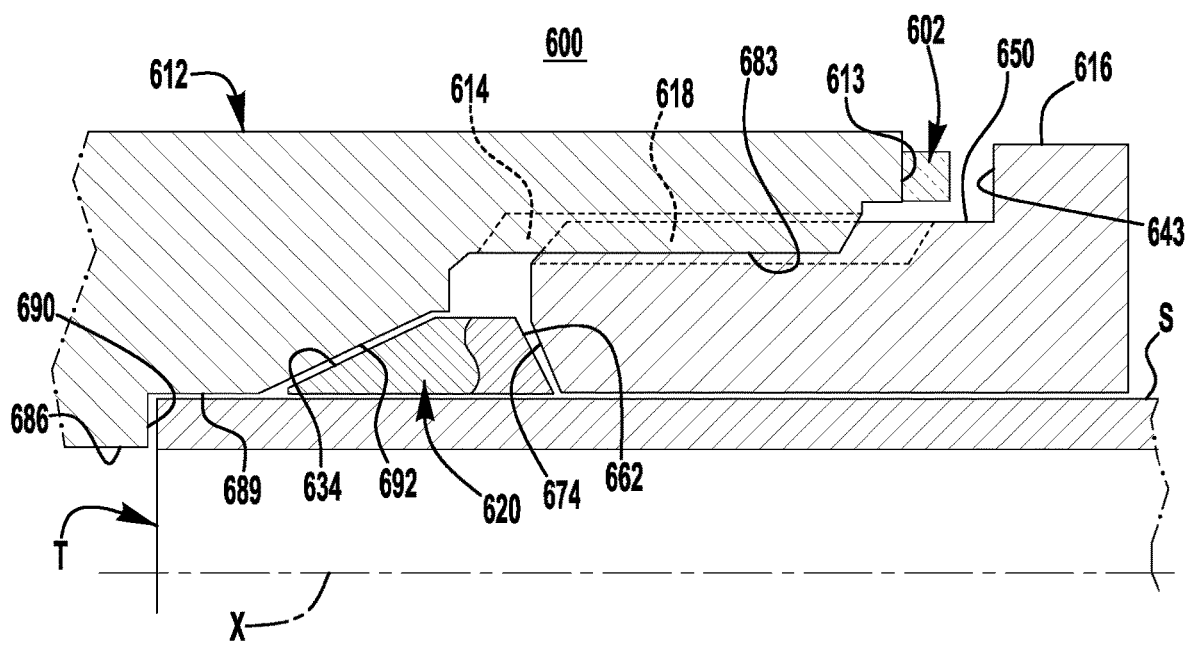
FIG. 6 illustrates a longitudinal cross-section of an exemplary embodiment of a fitting with an external deformable or compressible structure that facilitates pull-up by torque.

FIG. 6 illustrates an embodiment of a female fitting 600 that includes an external structure 602 that facilitates pull-up by torque. The fitting 600 includes first fitting component 612 that may be realized in the form of a female threaded body having internal threads 614 and a second fitting component 616 that may be realized in the form of a male threaded nut having external threads 618. The fitting 600 further includes a conduit gripping device 620. The nut 616 and conduit gripping device 620 fit onto a conduit end T that is received by the body 612.

The male nut 616 has a drive surface 674 that contacts a driven surface 662 of the tube gripping device 620 during pull-up. The body 612 has an opening 683 adapted to receive the tube end T. A central bore 686 extends through the body 612. The female body further includes a counterbore 689 that forms a shoulder 690. The tube end T bottoms against the shoulder 690 when received by the body 612. The female fitting component 612 further includes a tapered surface, surface 692. The surface 692 forms a ferrule camming surface in the body 612. A nose portion 634 of the tube gripping device 620 is positioned partially within the camming mouth formed by the ferrule camming surface 692. When the fitting is pulled up, the tube gripping devices 120 bites or indents into the tube surface S.

In the example illustrated by FIG. 6, the external structure 602 is disposed around a neck 650 of the male nut 616. The external structure 602 is deformable or compressible. The structure 602 may be formed integrally with the nut 616, integrally with the body 612, have a portion integrally formed with the nut and a portion integrally formed with the body, and/or the structure 602 may be a separate component. The illustrated structure 602 abuts a surface 643 of the nut 616 in the illustrated embodiment. In an embodiment, where the structure is integrally formed with the nut, the structure 602 abuts a surface 613 of the body. In an embodiment where the structure 602 is a separate member, the structure is compressed between the surfaces 643, 613. The structure is configured to cause the amount of torque required to continue pulling-up the fitting to sharply increase after the member is engaged between the body and the nut.

The ability of the structure 602 to be compressed and/or deformed allows the fitting to be remade. Each remake of the fitting 600 further compresses and/or deforms the structure 602 and progresses the nut 616 further onto the fitting body 612 for each re-make, even if only slightly.

In one embodiment, when the structure 602 is a separate member, the separate member may be configured to convert an existing fitting that may be pulled up only by turns to a fitting that may be pulled up by turns and may optionally be pulled up by torque.

Figure 8:
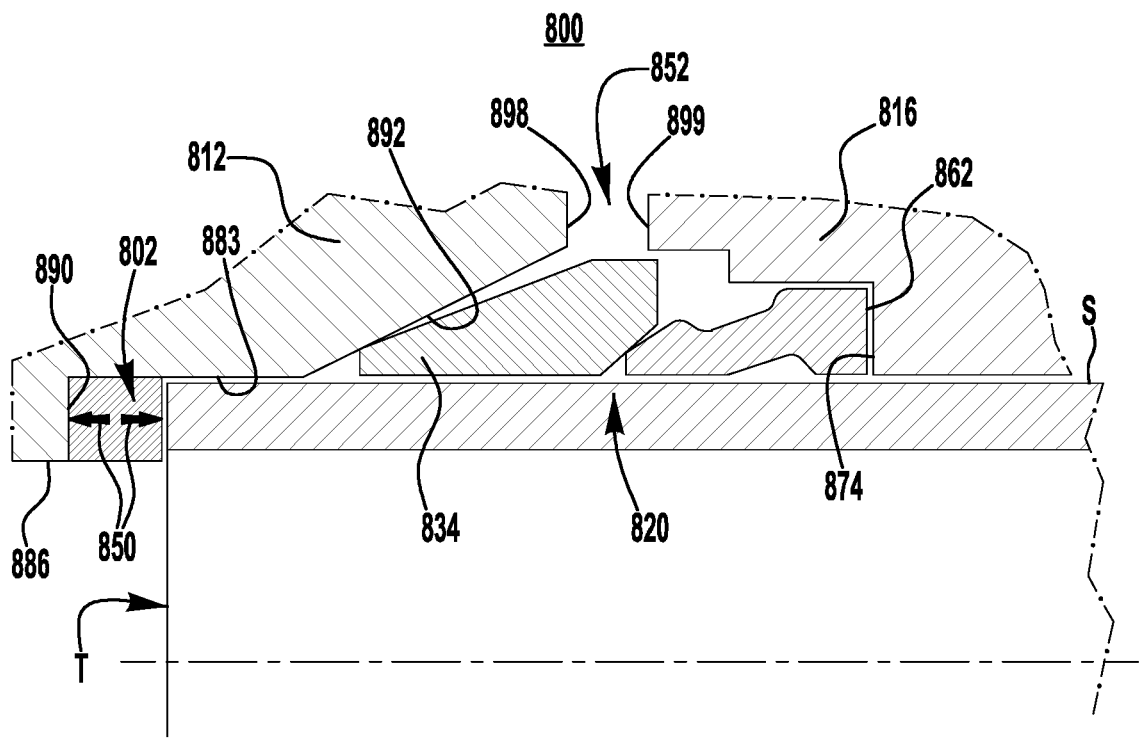
FIG. 8 illustrates a longitudinal cross-section of an exemplary embodiment of a fitting with an elastically deformable or compressible structure that facilitates remake of a fitting that is pulled up to a positive stop position.
Figure 7:
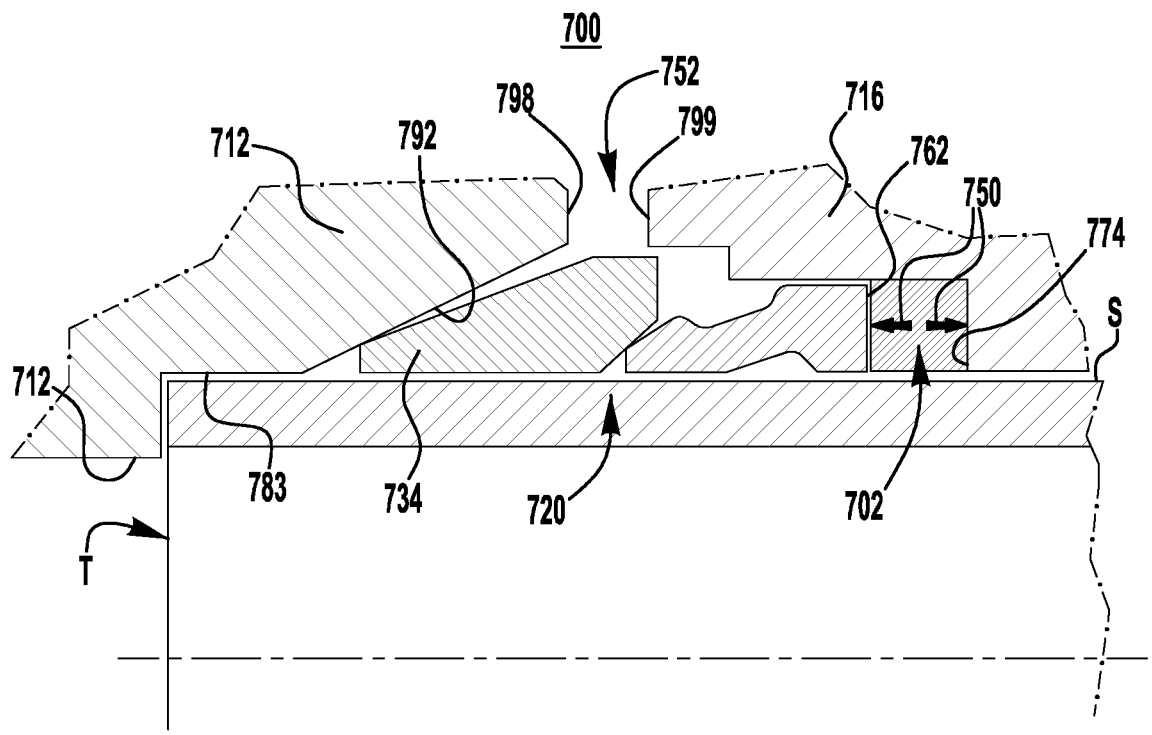
FIG. 7 illustrates a longitudinal cross-section of an exemplary embodiment of a fitting with an elastically deformable or compressible structure that facilitates remake of a fitting that is pulled up to a positive stop position.

FIGS. 7 and 8 illustrate embodiments of fittings that may provide a positive stop to indicate proper fitting pull-up and include deformable or compressible structures that facilitate remake of the fitting. In the embodiment illustrated by FIG. 7, a fitting 700 includes an elastically deformable structure 720 that is configured to be elastically deformed between a tube gripping device 702 and a fitting component 716 when the fitting 700 is pulled-up. When the elastically deformable structure 702 is compressed, energy is stored in the elastically deformable structure. In the example illustrated by FIG. 7, the fitting component 716 engages a fitting component 712 to provide an indication that the fitting is properly pulled-up. This engagement may be a positive stop or the engagement may allow additional axial movement of the fitting component 712 relatively toward the fitting component 716. When the fitting 700 is disassembled, the elastically deformable structure 702 returns to its original, uncompressed state. When the fitting is remade to the original pull-up position, the elastically deformable structure 702 is again compressed. The energy stored in the elastically deformable member 702 causes the elastically deformable member to apply opposite forces against the tube gripping device 720 and the fitting component 716 as indicated by arrows 750. In one embodiment, the force applied by the elastically deformable member 702 causes the tube gripping device 720 to reseal with the tube end T when the fitting is at the original pull-up position. This allows a positive stop to be provided between the fitting components 712, 716, while still allowing the fitting to be remade.

In the example illustrated by FIG. 7, the elastically deformable structure 702 is a separate component that is disposed between the tube gripping device 720 and the fitting component 716. In other embodiments, the elastically deformable structure 702 is integrally formed with the fitting component 716 and/or the tube gripping device 720. The elastically deformable structure 702 may be made from any material and take any configuration that allows the elastically deformable structure to apply a spring-like force to the tube gripping device 720 to cause the tube gripping device to reseal with the tube when the fitting is reassembled to the original pull-up position. The elastically deformable structure may be a spring, such as a belleville spring. In one embodiment, the elastically deformable structure is a belleville spring that retains its elasticity and returns to its original shape even when compressed flat. Examples of materials that the elastically deformable structure may be made from include the materials that are listed above.

The fitting component 712 may be a male fitting component that mates with a female fitting component 716 or the fitting component 712 may be a female fitting component that mates with a male fitting component 716. In the example illustrated by FIG. 7, the tube gripping device 720 includes two ferrules. However, the tube gripping device may comprise any number of ferrules. The tube gripping device 720 may comprise a single ferrule, there may be two ferrules, or alternative gripping devices may be used. The fitting component 716 and tube gripping device 720 fit onto the conduit end T that is received by the fitting component 712.

The fitting component 716 has a drive surface 774 that contacts the elastically compressible member 702, which in turn contacts a driven surface 762 of the tube gripping device 720 during pull-up. The fitting component 712 has an opening 783 adapted to receive the tube end T. A central bore 786 extends through the fitting component 712 and defines a fluid flow path. The tube end T bottoms against a shoulder 790. The fitting component 712 further includes a tapered surface 792 that engages the tube gripping device 720 to cause the tube gripping device 720 to grip and seal the tube end T.

A tube gripping device nose portion 734 is positioned at least partially within the camming surface 792. The driven surface 762 of a tube gripping device engages the elastically deformable structure 702, which engages the drive surface 774 of the fitting component 716. When the fitting is pulled up, the elastically deformable structure 702 is compressed or deformed and applies force against the tube gripping device 720 to cause the tube gripping device to bite or indent into the tube surface S, producing a strong tube grip and a fluid tight seal.

In the example illustrated by FIG. 7, the fitting components 712, 716 define structure 752 that causes the amount of torque required to continue pulling-up the fitting to sharply increase. In the FIG. 7 embodiment, this structure 752 comprises surfaces 798, 799 that define a positive stop, which inhibits the fitting from being tightened beyond the pull-up position. The structure 752 may also be configured to allow for additional tightening and axial displacement of the components 712, 716 beyond the initial pull-up position. For example, the structure may include one or more inclined surfaces or a deformable or compressible structure that allows additional axial advance. The structure 752 may be formed integrally with the fitting component 716, integrally formed with the fitting component 712, have a portion integrally formed with each of the fitting components and/or the structure may be a separate component. The structure 752 may be defined at any area of the fitting components. For example, the structure may be defined at an external surface the fitting components or internal surface of the fitting components. The structure 752 may take a wide variety of different forms. Any structure that provides a tactile indication that the fitting has reached the properly pulled-up position may be used.

In the embodiment illustrated by FIG. 8, a fitting 800 includes an elastically deformable structure 802 that is configured to be elastically deformed between a tube end T and a fitting component 812 when the fitting 800 is pulled-up. When the elastically deformable structure 802 is compressed, energy is stored in the elastically deformable structure. In the example illustrated by FIG. 8, a fitting component 816 engages a fitting component 812 to provide an indication that the fitting is properly pulled-up. This engagement may be a positive stop or the engagement may allow additional axial movement of the fitting component 812 relatively toward the fitting component 816. When the fitting 800 is disassembled, the elastically deformable structure 802 returns to its original, uncompressed state. When the fitting is remade to the original pull-up position, the elastically deformable structure 802 is again compressed. The energy stored in the elastically deformable member 802 causes the elastically deformable member to apply opposite forces against the tube end T and the fitting component 812 as indicated by arrows 850. The elastically deformable member 802 forces the tube end T against the tube gripping device 820 to reseal the tube with the tube gripping device 820 when the fitting is remade to the original pull-up position. This allows a positive stop to be provided between the fitting components 812, 816, while still allowing the fitting to be remade.

In the example illustrated by FIG. 8, the elastically deformable structure 802 is a separate component that is disposed between the tube end T and the fitting component 812. In other embodiments, the elastically deformable structure 802 is integrally formed with the fitting component 812 and/or the tube end T. The elastically deformable structure 802 may be made from any material and take any configuration that allows the elastically deformable structure to apply a spring-like force to the tube end T to cause the tube end T to reseal with the tube gripping device 820 when the fitting is reassembled to the original pull-up position. The elastically deformable structure may be a spring, such as a belleville spring. In one embodiment, the elastically deformable structure is a belleville spring that retains its elasticity and returns to its original shape even when compressed flat. Examples of materials that the elastically deformable structure may be made from are listed above.

The fitting component 812 may be a male fitting component that mates with a female fitting component 816 or the fitting component 812 may be a female fitting component that mates with a male fitting component 816. In the example illustrated by FIG. 8, the tube gripping device 820 includes two ferrules. However, the tube gripping device may comprise any number of ferrules. The fitting component 816 and tube gripping device 820 fit onto the conduit end T that is received by the fitting component 812.

The fitting component 816 has a drive surface 874 that contacts a driven surface 862 of the tube gripping device 820 during pull-up. The fitting component 812 has an opening 883 adapted to receive the elastically deforming structure 802 and the tube end T. A central bore 886 extends through the fitting component 812 and defines a fluid flow path. The fitting component 812 includes a shoulder 890. The elastically deformed structure 802 is disposed between the tube end T and the shoulder 890.

The fitting component 812 includes a tapered surface 892 that engages the tube gripping device 820 to cam the tube gripping device against the tube. A tube gripping nose portion 834 is positioned at least partially within the camming surface 892. The driven surface 862 of the tube gripping device 820 engages the drive surface 874 of the fitting component 816. When the fitting is pulled up, the tube gripping device 820 bites into the tube and drives tube end T against the elastically deformable structure 802. The elastically deformable structure 802 is compressed between the tube end T and the shoulder 890 of the fitting component 812.

In the example illustrated by FIG. 8, the fitting components 812, 816 define structure 852 that causes the amount of torque required to continue pulling-up the fitting to sharply increase. In the FIG. 8 embodiment, this structure 852 comprises first and second surfaces 898, 899 that define a positive stop, which inhibits the fitting from being tightened beyond the pull-up position. In another embodiment, the structure 852 may be configured to allow for additional tightening of the components 812, 816 beyond the initial pull-up position. Any structure that provides a tactile indication that the fitting has reached the properly pulled-up position may be used.

Figure 9A:
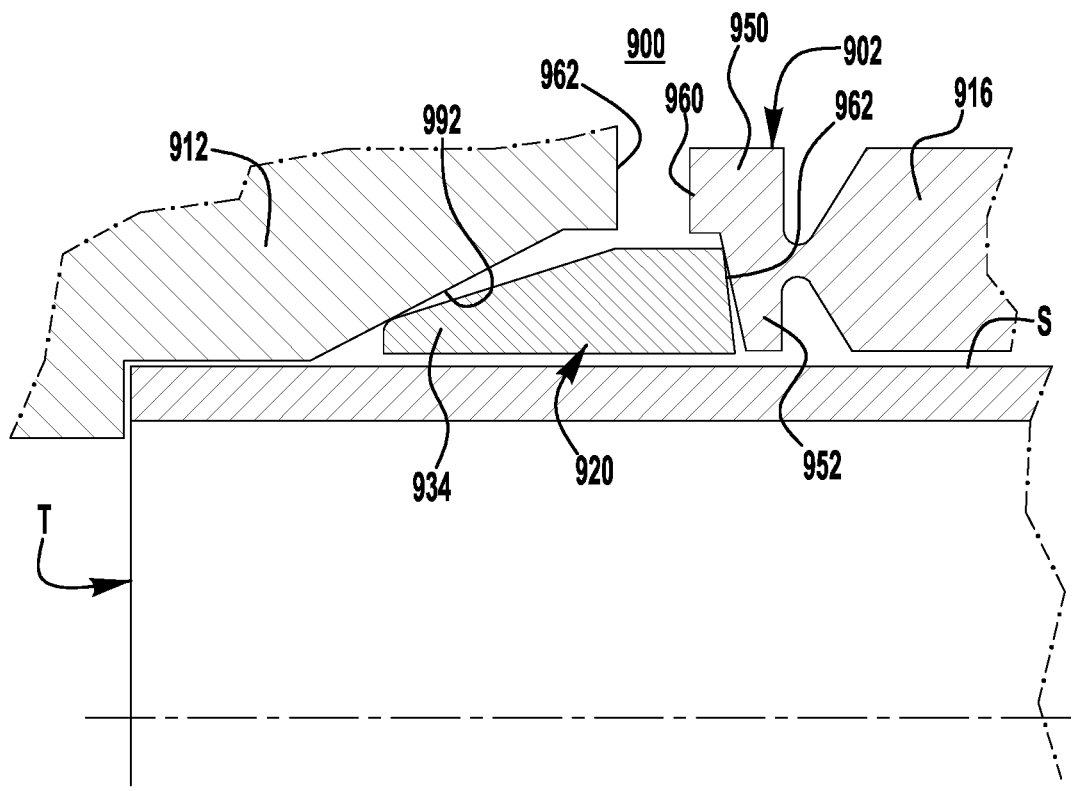
FIG. 9A illustrates a longitudinal cross-section of an exemplary embodiment of a fitting with an internal deformable or compressible structure that facilitates pull-up by torque.
Figure 9B:
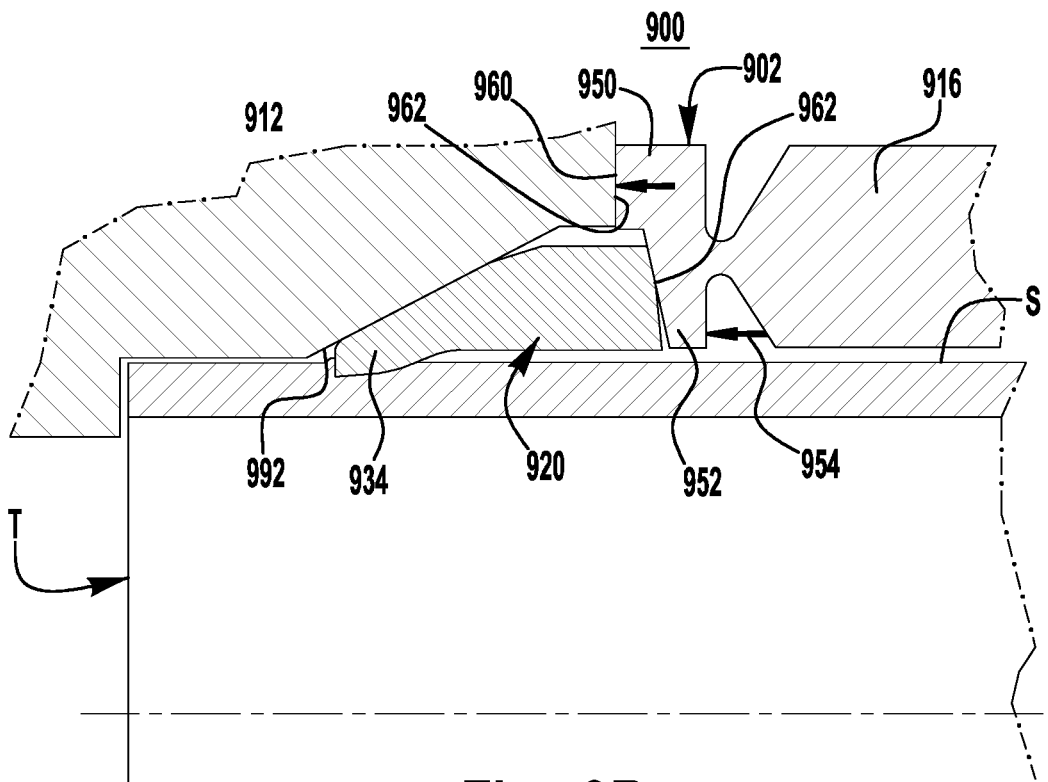
FIG. 9B illustrates the fitting shown in FIG. 9A in a pulled up position.

FIGS. 9A and 9B illustrate an embodiment of a fitting 900 with a deformable or compressible structure 902 that both engages a conduit gripping device 920 to bring the deformable structure 902 device into sealing engagement with the conduit and engages fitting components 912 and 916 to provide a sharp rise in torque that indicates that the fitting is properly pulled-up. The conduit gripping device 920 includes a stop portion 950 and a ferrule drive arm 952. When the fitting 900 is pulled-up for a first time, the ferrule drive arm 952 advances the tube gripping device 920 until the stop portion 950 engages the fitting component 912. The engagement between the stop portion 950 and the fitting component 912 causes a sharp rise in torque that indicates that the ferrule is properly pulled up. Referring to FIG. 9B, the ferrule drive arm 952 may be flexed with respect to the stop portion 950 as indicated by arrow 954 to allow the fitting to be remade. The flexing of the ferrule drive arm 952 with respect to the stop portion may cause elastic or plastic deformation of the deformable or compressible structure 902. In the embodiment illustrated by FIGS. 9A and 9B, the deformable or compressible structure 902 is integrally formed with the fitting component 916. In another embodiment, the deformable or compressible structure 902 is connected to the fitting component 916. In another embodiment, the deformable or compressible structure 902 is a separate member that the fitting component 916 presses against.

The deformable or compressible structure 902 may be made from any material and take any configuration that drives the tube gripping device 920 into sealing engagement with the tube, provides a sharp increase in torque when the fitting is pulled-up, and allows the fitting to be remade. Examples of materials that the elastically deformable structure 902 may be made from are listed above.

The fitting component 912 may be a male fitting component that mates with a female fitting component 916 or the fitting component 912 may be a female fitting component that mates with a male fitting component 916. The tube gripping device 920 may comprise any number of ferrules or other tube gripping and/or sealing structures. The fitting component 916 and tube gripping device 920 fit onto a conduit end T that is received by the fitting component 912.

The fitting component 916 drives the deformable or compressible member 902, which in turn contacts a driven surface 962 of the tube gripping device 920 during pull-up. The fitting component 912 includes a tapered surface 992 that engages the tube gripping device 920 and presses the tube gripping device into sealing engagement with the tube end T.

A nose portion 934 of the tube gripping device is positioned at least partially within the camming surface 992. The driven surface 962 of a tube gripping device engages the deformable or compressible structure 902 which is driven by the first fitting component 916. When the fitting is pulled up, the drive arm 952 of the deformable or compressible structure 902 applies force against the tube gripping device 920 to cause the tube gripping device to bite or indent into the tube surface S, producing a strong tube grip and a fluid tight seal. When the fitting 900 reaches the pulled-up position, a wall 960 of the stop portion 950 abuts against a wall 962 of the fitting component 912. At this point, additional axial advance of the tube gripping device 920 may only be achieved by flexing the drive arm 952 with respect to the stop portion as indicated by arrow 954 in FIG. 9B. This additional axial advance allows the fitting to be remade.

Figure 10A:
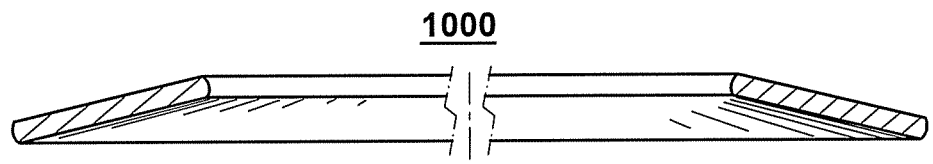
FIG. 10A is an illustration of a belleville washer.
Figure 10B:
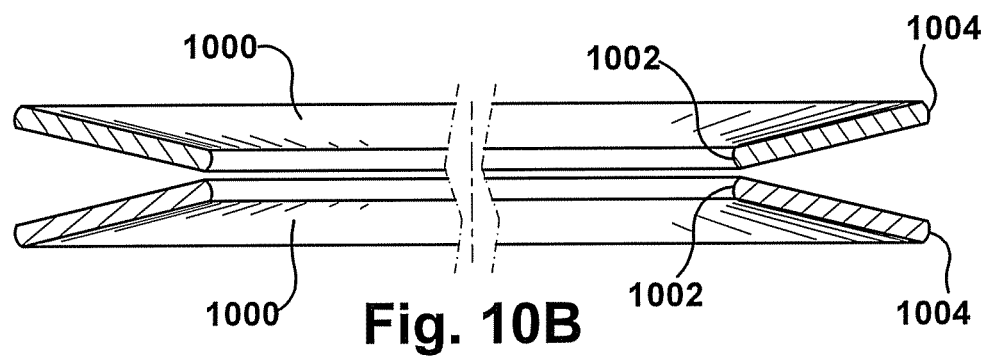
FIG. 10B is an illustration of two belleville washers arranged in a series configuration.
Figure 10C:
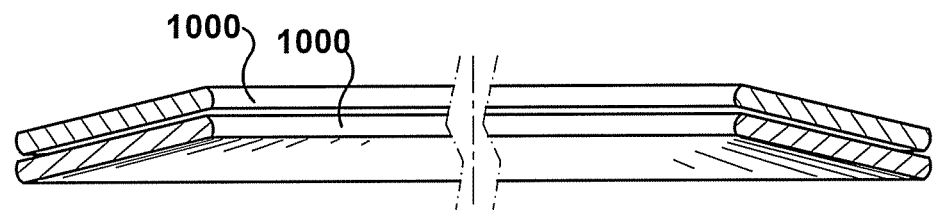
FIG. 10C is an illustration of two belleville washers arranged in a parallel configuration.

The deformable or compressible members in the fitting embodiments illustrated by FIGS. 1-9 may take a wide variety of different forms. In one embodiment, the deformable or compressible members comprise one or more belleville washers 1000. The belleville washers may be configured to be plastically deformed during pull up of the fitting or the belleville washers may be configured to be elastically deformed by pull up of the fitting to the initial pull up position. A single belleville washer may be used (FIG. 10A), multiple belleville washers may be assembled in a series configuration (FIG. 10B), multiple belleville washers may be assembled in a parallel configuration (FIG. 10C) or multiple belleville washers may be assembled with some of the washers in a series configuration and some of the washers in a parallel configuration. FIG. 10B illustrates one series configuration where radially inner surfaces 1002 of the washers engage one another. In another series configuration, radially outer surfaces 1004 engage one another.

Figure 11A:
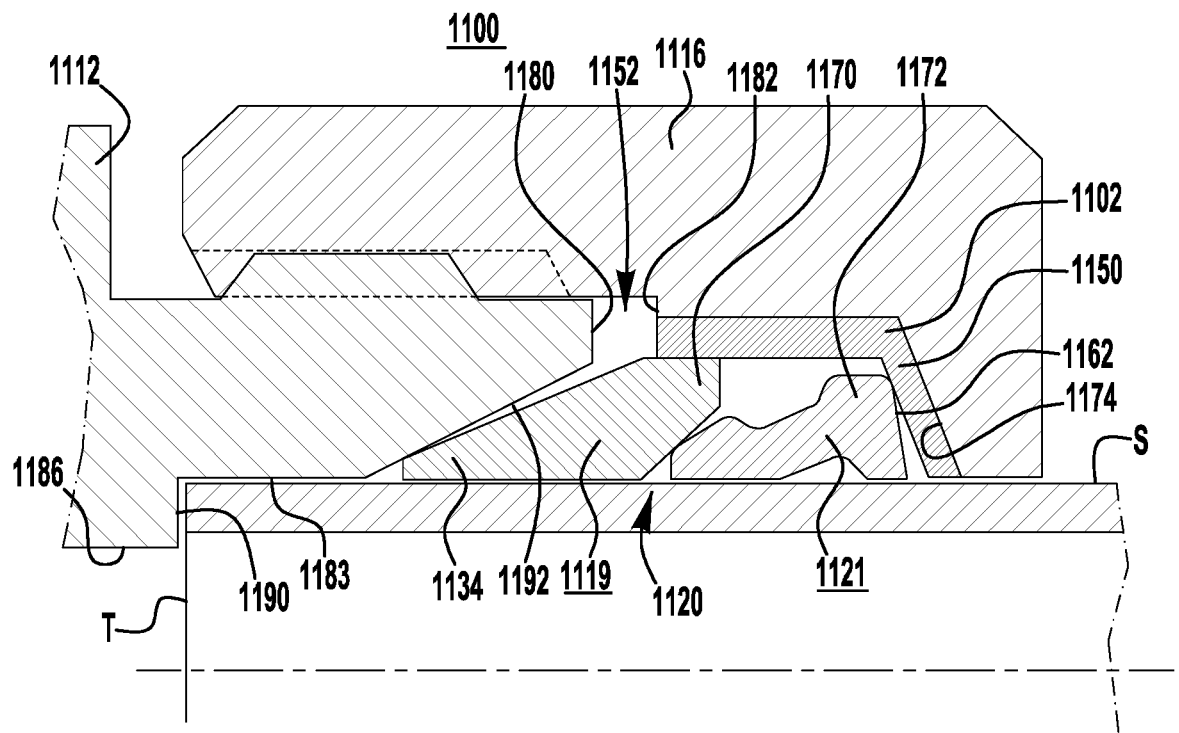
FIG. 11A illustrates a longitudinal cross-section of an exemplary embodiment of a fitting with an internal deformable or compressible structure that maintains a grip and seal of a conduit gripping device on conduit when the fitting is disassembled.
Figure 11B:
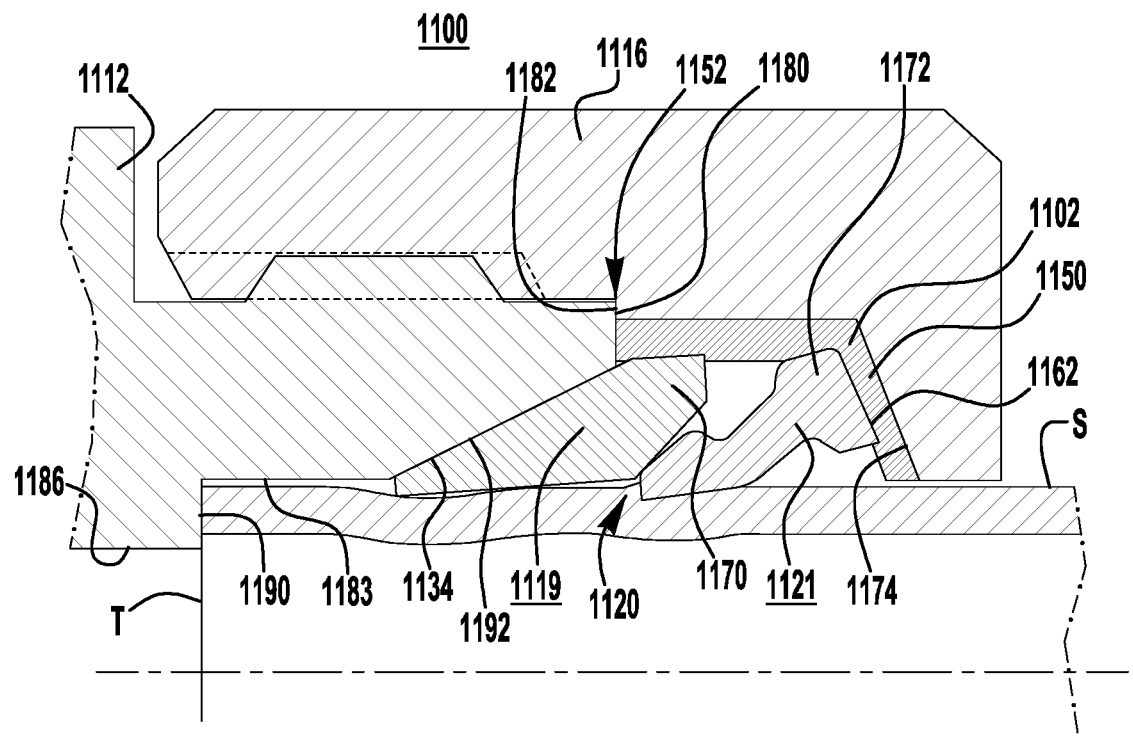
FIG. 11B illustrates the fitting shown in FIG. 11A in a pulled up position.

FIGS. 11A and 11B illustrate an embodiment of a fitting 1100 that may provide a positive stop to indicate proper fitting pull-up and that includes a plastically deformable structure 1102 that facilitates remake of the fitting. The plastically deformable structure 1102 is configured to be plastically deformed around the tube gripping device 1120 when the fitting is pulled-up to the positive stop position. When the fitting 1100 is disassembled, the plastically deformable structure 1102 remains deformed around the tube gripping device 1120 and maintains the grip and seal of the tube gripping device 1120 on the conduit. The fitting is remade by pulling the fitting up to the positive stop position to reestablish the seal between a fitting component 1112 and the tube gripping device 1120.

In the example illustrated by FIG. 11, the fitting component 1116 engages a fitting component 1112 to provide an indication that the fitting is properly pulled-up. In the illustrated example, this engagement provides a positive stop. In another embodiment, a structure may be provided such that allows additional axial movement of the fitting component 1012 relatively toward the fitting component 1016 after initial pull up.

In the example illustrated by FIG. 11, the plastically deformable structure 1102 is a separate component that is disposed between the tube gripping device 1120 and the fitting component 1116. In another embodiment, the plastically deformable structure 1112 is integrally formed with the fitting component 1116 and breaks away from the fitting component 1116 when the fitting is disassembled after initial pull-up. In another embodiment, the plastically deformable structure 1102 is integrally formed with the tube gripping device 1120. The plastically deformable structure 1102 may be made from any material and take any configuration that allows the plastically deformable structure to deform against the tube gripping device 1120 and maintain the grip and seal of the tube gripping device with the tube when the fitting is disassembled. Examples of materials that the plastically deformable structure 1120 may be made from are listed above.

In the example illustrated by FIGS. 11A and 11B, the fitting component 1112 is a male fitting component that mates with a female fitting component 1116. In another embodiment, the fitting component 1112 may be configured as a female fitting component and the fitting component 1116 may be configured as a male fitting component. In the example illustrated by FIGS. 11A and 11B, the tube gripping device 1120 includes two ferrules. However, the tube gripping device 1120 may comprise any number of ferrules. The tube gripping device 1120 may comprise a single ferrule, there may be two ferrules, or alternative gripping devices may be used. The fitting component 1116 and tube gripping device 1120 fit onto a conduit end T that is received by the fitting component 1112.

In the example illustrated by FIGS. 11A and 11B, the fitting component 1116 has a drive surface 1174 that contacts the plastically deformable member 1102, which in turn contacts a driven surface 1162 of the tube gripping device 1120 during pull-up. In an alternate embodiment, a drive portion 1150 of the plastically deformable member 1102 is omitted and the drive surface 1174 contacts the tube gripping device 1120 directly.

The fitting component 1112 has an opening 1183 adapted to receive the tube end T. A central bore 1186 extends through the fitting component 1112 and defines a fluid flow path. The fitting component 1112 includes a shoulder 1190 that the tube end T bottoms against. The fitting component 1112 further includes a tapered surface 1192 that engages the tube gripping device 1120.

Referring to FIG. 11A, a tube gripping nose portion 1134 is positioned at least partially within the camming surface 1194. The driven surface 1162 of the tube gripping device engages the plastically deformable structure 1102, which engages the drive surface 1174 of the fitting component 1116.

Referring to FIG. 11B, when the fitting is pulled up, the drive portion 1150 of the plastically deformable structure 1102 deforms around the drive surface 1174 and applies force against the tube gripping device 1120 to cause the tube gripping device to bite or indent into the tube surface S, producing a strong tube grip and a fluid tight seal. When the fitting 1100 is pulled up, one or more portions of the tube gripping device 1120 move radially outward. The portion or portions that move radially outward engage the plastically deformable structure 1102 and cause the plastically deformable structure to deform around the portions of the tube gripping device. In the example illustrated by FIGS. 11A-11C, the tube gripping device 1120 comprises a front ferrule 1119 and a rear ferrule 1121. Referring to FIG. 11B, when the fitting 1100 is pulled up, a rear portion 1170 of the front ferrule 1119 and a rear portion 1172 of the rear ferrule 1121 move radially outward. The rear portion 1170 of the front ferrule 1119 and the rear portion 1172 of the rear ferrule 1121 engage the plastically deformable structure 1102 and cause the plastically deformable structure to deform around the rear portions 1170, 1172.

Figure 11C:
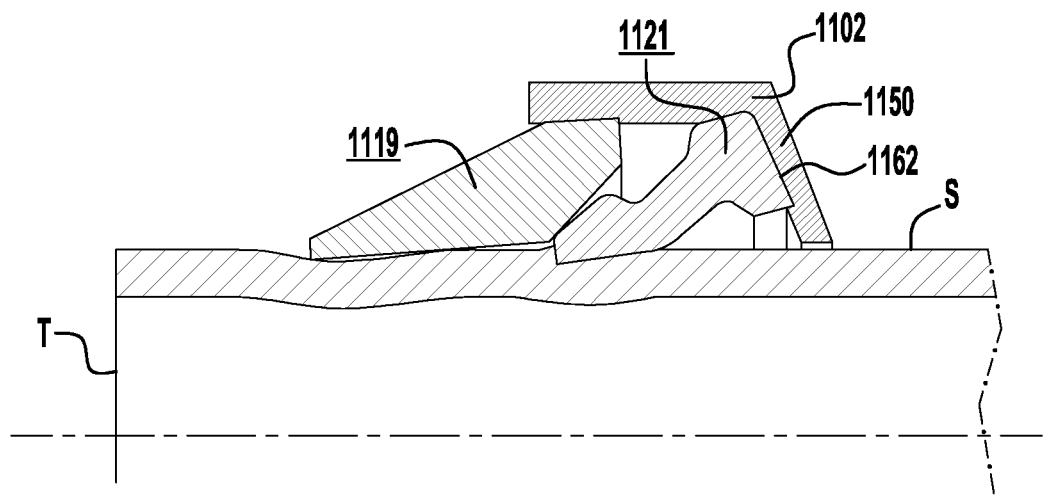
FIG. 11C illustrates components of the fitting of FIG. 11A where the deformable or compressible structure maintains the conduit gripping device on the conduit when the fitting is disassembled.

Referring to FIG. 11C, when the fitting is disassembled, the tube gripping device 1120 is retained on the tube end T by the plastically deformable structure 1102 such that the grip and seal of the tube gripping device with the tube end T is maintained. When the fitting 1100 is remade, a seal is formed between the tube gripping device 1120 and the fitting component 1112. In the example illustrated by FIG. 11B, this seal is formed between the front ferrule 1119 and the fitting component 1112.

In the example illustrated by FIGS. 11A, 11B, and 11C, the fitting components 1112, 1116 define structure 1152 that causes the amount of torque required to continue pulling-up the fitting to sharply increase. In the FIG. 11 embodiment, this structure 1152 comprises a surface 1180 of the fitting component 1112 and a surface 1182 of the fitting component 1116 that define a positive stop. The positive stop inhibits the fitting from being tightened beyond the pull-up position. In another embodiment, the structure 1152 is configured to allow for additional axial advance of the components 1112, 1116 beyond the initial pull-up position. The structure 1152 may be formed integrally with the fitting component 1116, integrally formed with the fitting component 1112, have a portion integrally formed with each of the fitting components and/or the structure 1152 may be a separate component. The structure 1152 may be defined at any area of the fitting components. For example, the structure 1152 may be defined by external surfaces of the fitting components or by one or more internal surfaces of the fitting components. In this application, an internal surface of the fitting components is a surface that is not exposed or touchable from outside the fitting when the fitting is pulled up. The structure 1152 may take a wide variety of different forms. Any structure that provides a tactile indication that the fitting has reached the properly pulled-up position may be used.

Figure 12:
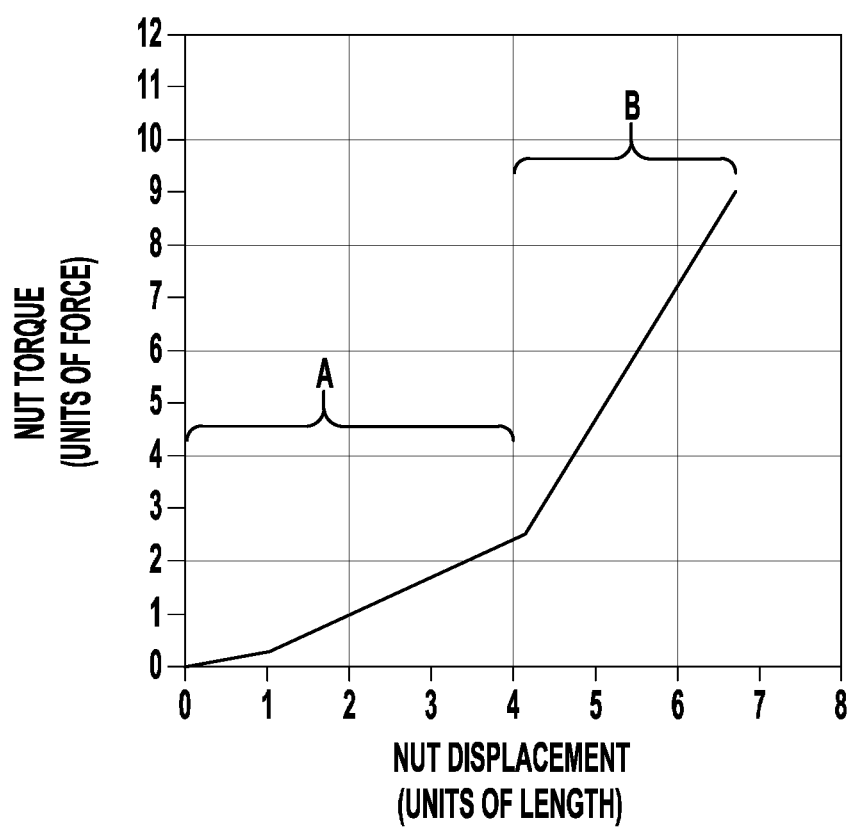
FIG. 12 is a graph that illustrates nut displacement versus nut torque for fittings that include a torque increasing mechanism.

In many of the embodiments described in this application, the assembler will also notice a sharp and dramatic increase in pull-up torque. FIG. 12 is a graph that illustrates a sharp increase in torque that may occur when one of the fittings described above is pulled up. Note that in region A the torque rises somewhat slowly and steadily as a result of the tube gripping device or devices plastically deforming while biting into the tube T and camming against the body camming surface. When the relative positions of the fitting components cause one of the torque increasing arrangements disclosed above to act, however, the torque in region B increases sharply and dramatically. For example the rate at which the torque required to further pull-up the fitting may increase by a factor of two or more when one of the disclosed fittings are properly pulled up. By selecting an appropriate torque value that corresponds to proper pull-up, the fitting may be pulled-up by torque rather than by turns. Thus, a simple torque wrench may be used to make-up the fitting.

In another exemplary embodiment, the fittings disclosed above are modified such that the deformable or compressible structures that facilitates pull-up by torque are replaced with non-deformable or non-compressible structures that provide a positive stop to indicate completed pull-up and that are adjustable to allow the fitting to be remade once or multiple times. The non-deformable or non-compressible structures that provide a positive stop and are adjustable to allow remakes of the fitting may take a wide variety of different forms. Any structure that provides a positive stop or substantially a positive stop and may be adjusted to allow for additional axial advance of one or more of the fitting components may be used.

Figure 13A:
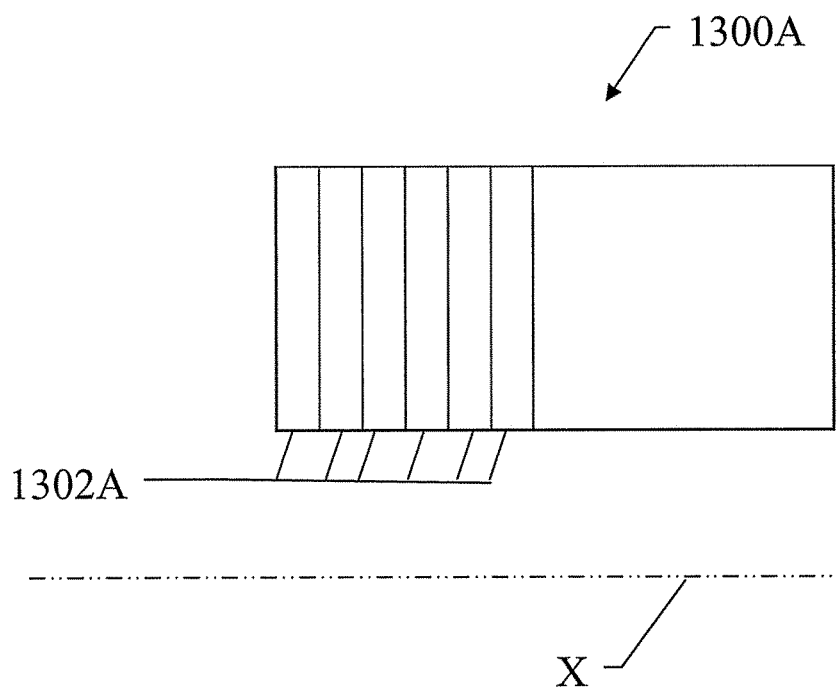
FIG. 13A is a schematic illustration of an adjustable, non-deformable structure for providing and indication of completed pull-up.
Figure 13B:
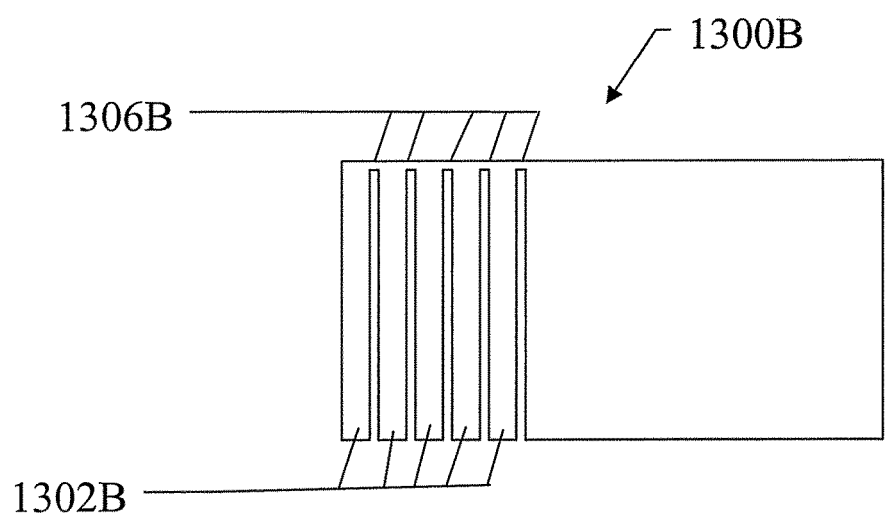
FIG. 13B is a schematic illustration of an adjustable, non-deformable structure for providing and indication of completed pull-up.
Figure 13C:
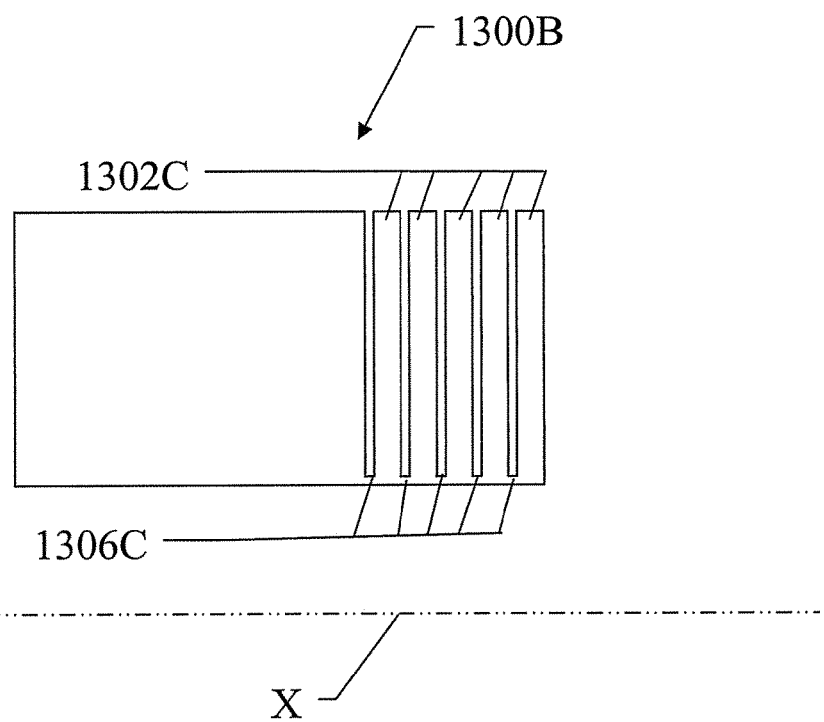
FIG. 13C is a schematic illustration of an adjustable, non-deformable structure for providing and indication of completed pull-up.

FIGS. 13A, 13B, and 13B illustrate examples of non-deformable or substantially non-deformable structures 1300A, 1300B and 1300C that provide a positive stop and may be adjusted to allow for remakes. The structures 1300A, 1300B and 1300C may be employed in the fittings illustrated in FIGS. 1, 2, 3A, 3B, 4, 5, 6 and 7 instead of the structures 102, 202, 302, 402, 602 and 802. The structures 1300A, 1300B, and 1300C are illustrated as individual or separate components, but may be formed integrally or be attached to other fitting components.

The structures 1300A, 1300B and 1300C are rings that are centered on a longitudinal axis X. The structures 1300A, 1300B and 1300C each include one or more removable portions 1302A, 1302B, and 1302C. The removable portions 1302A are connected to the remainder of the structure 1300A, but are easily removable to reduce the length of the structure. For example, the removable portions 1302A may be glued to the remainder of the structure 1300A with a releasable adhesive. A releasable adhesive may be applied to any portion of the removable portion 1302. The removable portions 1302B, 1304C are connected by frangible portions 1306B, 1306C. The frangible portions 1306B, 1306C may be formed by machining the structure 1300B. 1300C from a single piece of material or by welding, brazing, etc. The frangible portions 1306B are illustrated as being formed at a radially outer surface of the structure 1300B and the frangible portions 1306C are illustrated as being formed at a radially inner surface of the structure 1300C. However, the frangible portions may be formed at any position on the structure. The frangible portions 1306B may or may not extend around the entire outer cylindrical surface of the structure 1300B and the to the frangible portions 1306C may or may not extend around the entire inner cylindrical surface of the structure 1300C. The removable portions 1302B and 1302C are removed by breaking the frangible portions 1306B, 1306C.

The structures 1300A, 1300B, 1300C are engaged in the fittings illustrated in FIGS. 1, 2, 3A, 3B, 4, 5, 6 and 7 in the same manner as the structures 102, 202, 302, 402, 602 and 802. However, since the structures 1300A, 1300B, 1300C are non-deformable the structures provide a positive stop when the fitting is properly pulled-up. When the fitting is disassembled, one of the removable portions 1302A, 1302B, 1302C may be removed. When the fitting is reassembled, the shortened structures 1300A, 1300B, 1300C permit further axial advance of the fitting components to facilitate remake of the fitting. The shortened structures 1300A, 1300B, 1300C provide a positive stop at the appropriate remake position. In an exemplary embodiment, the fitting may be remade multiple times in this manner. Since the structures 1300A, 1300B and 1300C are preconfigured, the fitting manufacturer may control the axial stroke for initial pull-up, the axial stoke for each remake, and the number of remakes.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A method of assembling a conduit fitting, comprising:
providing a conduit fitting including a first coupling member, a second coupling member, an internal conduit gripping device disposed between said first coupling member and said second coupling member, and an external deformable structure; and
pulling up the first coupling member with the second coupling member on an end portion of a conduit to engage the external deformable structure with an external surface of one of the first and second coupling members;
after engaging the external deformable structure with the external surface of one of the first and second coupling members, continuing to pull up the first coupling member with the second coupling member to axially compress the external deformable structure, until an amount of torque required to continue pulling up the first coupling member increases to an initial pull-up torque;
wherein the initial pull-up torque corresponds to an initial pulled-up position in which the conduit gripping device grips and seals the conduit, wherein the initial pull-up torque results from a sharp increase in an amount of torque required to continue pulling up the first coupling member, the sharp increase comprising an increase in torque by a factor of two or more.

2. The method of claim 1 wherein the axial compression of the deformable structure facilitates further axial advance of the first coupling member relatively toward the second coupling member beyond said initial pulled-up position.

3. The method of claim 2 wherein said further axial advance permits remake of said fitting.

4. The method of claim 1 wherein axial compression of the deformable structure facilitates further axial advance of the first coupling member relatively toward the second coupling member beyond said initial pulled-up position, and said further axial advance permits remake of said fitting by applying said initial pull-up torque.

5. The method of claim 1 wherein the deformable structure is elastically deformed to provide said indication of completed pull-up.

6. The method of claim 1 wherein the deformable structure is plastically deformed to provide said indication of completed pull-up.

7. The method of claim 1 wherein the deformable structure is integrally formed with one of the first and second coupling members.

8. The method of claim 1 wherein the deformable structure is a separate member, the method further comprising assembling the deformable structure between the first and second coupling members.

9. The method of claim 1, wherein the first coupling member comprises a female threaded nut, wherein pulling up the first coupling member with the second coupling member comprises threadably mating the female threaded nut with the second coupling member.

10. The method of claim 9, wherein the external deformable structure is integral with the female threaded nut.

11. A method of assembling a conduit fitting, comprising:
providing a conduit fitting including a fitting nut, a fitting body, and an internal conduit gripping device disposed between said fitting nut and said fitting body, wherein the fitting nut includes an external deformable structure integrally formed with an end portion of the fitting nut;
pulling up the fitting nut with the fitting body on an end portion of a conduit to engage the external deformable structure with an external surface of the fitting body;
after engaging the external deformable structure with the external surface of the fitting body, continuing to pull up the fitting nut with the fitting body to axially compress the external deformable structure, until an amount of torque required to continue pulling up the fitting nut increases to an initial pull-up torque;
wherein the initial pull-up torque corresponds to an initial pulled-up position in which the conduit gripping device grips and seals the conduit, wherein the initial pull-up torque results from a sharp increase in an amount of torque required to continue pulling up the first coupling member, the sharp increase comprising an increase in torque by a factor of two or more.

12. The method of claim 11 wherein axial compression of the deformable structure facilitates further axial advance of the fitting nut relatively toward the fitting body beyond said initial pulled-up position, and said further axial advance permits remake of said fitting by applying said initial pull-up torque.

13. The method of claim 11 wherein the deformable structure is elastically deformed to provide said indication of completed pull-up.

14. The method of claim 11 wherein the deformable structure is plastically deformed to provide said indication of completed pull-up.

15. A method of assembling a conduit fitting, comprising:
providing a conduit fitting including a first coupling member, a second coupling member, an internal conduit gripping device disposed between said first coupling member and said second coupling member, and an external deformable structure integrally formed with one of the first and second coupling members; and
pulling up the first coupling member with the second coupling member on an end portion of a conduit to engage the external deformable structure with an external surface of the other of the first and second coupling members;
after engaging the external deformable structure with the external surface of the other of the first and second coupling members, continuing to pull up the first coupling member with the second coupling member to axially compress the external deformable structure, until an amount of torque required to continue pulling up the first coupling member increases by at least a factor of two;
wherein the torque increase corresponds to an initial pulled-up position in which the conduit gripping device grips and seals the conduit.

* * * * *